US011785220B2

(12) United States Patent
Chen et al.

(10) Patent No.: US 11,785,220 B2
(45) Date of Patent: Oct. 10, 2023

(54) HANDLING OF MULTIPLE PICTURE SIZE AND CONFORMANCE WINDOWS FOR REFERENCE PICTURE RESAMPLING IN VIDEO CODING

(71) Applicant: Huawei Technologies Co., Ltd., Shenzhen (CN)

(72) Inventors: Jianle Chen, San Diego, CA (US); F N U Hendry, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 59 days.

(21) Appl. No.: 17/565,243

(22) Filed: Dec. 29, 2021

(65) Prior Publication Data

US 2022/0159262 A1 May 19, 2022

Related U.S. Application Data

(63) Continuation of application No. PCT/US2020/041026, filed on Jul. 7, 2020.
(Continued)

(51) Int. Cl.
*H04N 19/132* (2014.01)
*H04N 19/105* (2014.01)
(Continued)

(52) U.S. Cl.
CPC ......... *H04N 19/132* (2014.11); *H04N 19/105* (2014.11); *H04N 19/159* (2014.11);
(Continued)

(58) Field of Classification Search
CPC .. H04N 19/132; H04N 19/105; H04N 19/159; H04N 19/172; H04N 19/30;
(Continued)

(56) References Cited

U.S. PATENT DOCUMENTS 9,420,307 B2 *  8/2016  Wang ................... H04N 19/174
11,632,788 B2 *  4/2023  Li ........................ H04N 19/174
(Continued)

FOREIGN PATENT DOCUMENTS

CN   104919803 A   9/2015
CN   105340276 A   2/2016

OTHER PUBLICATIONS

"Advanced Video Coding for Generic Audiovisual Services," Series H: Audiovisual and Multimedia Systems Infrastructure of Audiovisual Services—Coding of Moving Video, ITU-T H.264, Jun. 2019, 836 pages.
(Continued)

*Primary Examiner* — Marnie A Matt
(74) *Attorney, Agent, or Firm* — Conley Rose, P.C.

(57) ABSTRACT

A method of decoding includes receiving a first picture parameter set and a second picture parameter set each referring to same sequence parameter set, the first picture parameter set and the second picture parameter set having same values of a conformance window when the first picture parameter set and the second picture parameter set have same values of picture width and picture height, and applying the conformance window to a current picture corresponding to the first picture parameter set or the second picture parameter set.

20 Claims, 12 Drawing Sheets

Related U.S. Application Data

(60) Provisional application No. 62/871,493, filed on Jul. 8, 2019.

(51) Int. Cl.
  *H04N 19/159* (2014.01)
  *H04N 19/172* (2014.01)
  *H04N 19/30* (2014.01)
  *H04N 19/46* (2014.01)

(52) U.S. Cl.
  CPC ........... *H04N 19/172* (2014.11); *H04N 19/30* (2014.11); *H04N 19/46* (2014.11)

(58) Field of Classification Search
  CPC ........ H04N 19/46; H04N 19/59; H04N 19/70; H04N 19/577; H04N 19/521; H04N 19/547; H04N 19/593; H04N 19/625; H04N 19/82; H04N 19/91; H04N 19/96; H04N 19/184
  See application file for complete search history.

(56) References Cited

U.S. PATENT DOCUMENTS

| | | | |
|---|---|---|---|
| 2014/0198857 A1* | 7/2014 | Deshpande | ........ H04N 21/8451 |
| 2015/0010051 A1* | 1/2015 | Chen | .................... H04N 19/423 375/240.25 |
| 2015/0304666 A1* | 10/2015 | Seregin | ................ H04N 19/174 |
| 2019/0058895 A1* | 2/2019 | Deshpande | ........ H04N 21/8451 |
| 2019/0075323 A1 | 3/2019 | Yamamoto | |
| 2019/0174144 A1 | 6/2019 | Hannuksela | |
| 2021/0329226 A1 | 10/2021 | Hendry | |

OTHER PUBLICATIONS

"High Efficiency Video Coding," Series H: Audiovisual and Multimedia Systems Infrastructure of Audiovisual Services—Coding of Moving Video, ITU-T H.265, Dec. 2016, 664 pages.

"Line Transmission of Non-Telephone Signals, Video Codec for Audiovisual Services at p x 64 kbits," ITU-T Recommendation H.261, Mar. 3, 1993, 29 pages.

"Transmission of Non-Telephone Signals, Information Technology—Generic Coding of Moving Pictures and Associated Audio Information: Video," ITU-T H.262, Jul. 1995, 211 pages.

Bross, et al., "Versatile Video Coding (Draft 3)," Joint Video Experts Team (JVET) of ITU-T SG 16 WP 3 and ISO/IEC JTC 1/SC 29/WG 11, 14th Meeting: Geneva, CH, Mar. 19-27, 2019, JVET-N1001-v8, 400 pages.

Bross, et al., "Versatile Video Coding (Draft 5)," Joint Video Experts Team (JVET) of ITU-T SG 16 WP 3 and ISO/IEC JTC 1/SC 29/WG 11, 14th Meeting: Geneva, CH, Mar. 19-27, 2019, JVET-N1001-v10, 407 pages.

Bross, et al., "Versatile Video Coding (Draft 5)," Joint Video Experts Team (JVET) of ITU-T SG 16 WP 3 and ISO/IEC JTC 1/SC 29/WG 11, 14th Meeting: Geneva, CH, Mar. 19-27, 2019, JVET-N1001-v3, 371 pages.

Video Coding for Low Bit Rate Communication, Series H: Audiovisual and Multimedia Systems Infrastructure of Audiovisual Services—Coding of Moving Video, ITU-T H.263, Jan. 2005, 226 pages.

Document: JVET-O0133-v2, Hendry, et al., "AHG8: Support for reference picture resampling—handling of picture size signalling, conformance windows, and DPB management," Joint Video Experts Team (JVET) of ITU-T SG 16 WP 3 and ISO/IEC JTC 1/SC 29/WG 11, 15th Meeting: Gothenburg, SE, Jul. 3-12, 2019, 3 pages.

Document: JVET-N1001-v8, Bross, B., et al., "Versatile Video Coding (Draft 5)," Joint Video Experts Team (JVET) of ITU-T SG 16 WP 3 and ISO/IEC JTC 1/SC 29/WG 11, 14th Meeting: Geneva, CH, Mar. 19-27, 2019, 399 pages.

Document: JVET-N1001-v9, Bross, B., et al., "Versatile Video Coding (Draft 5)," Joint Video Experts Team (JVET) of ITU-T SG 16 WP 3 and ISO/IEC JTC 1/SC 29/WG 11, 14th Meeting: Geneva, CH, Mar. 19-27, 2019, 408 pages.

Document: JVET-O1164-v1, Chen, P., et al., "AHG8: Integrated Specification Text for Reference Picture Resampling," Joint Video Experts Team (JVET) of ITU-T SG 16 WP 3 and ISO/IEC JTC 1/SC 29/WG 11, 15th Meeting: Gothenburg, SE, Jul. 3-12, 2019, 1 page.

Document: JVET-O0133-v2, Hendry, et al., "AHG 8: reference picture resampling—handling of picture size signalling, conformance windows, and DPB management," JVET-O0133-v2, Joint Video Experts Team (JVET) of ITU-T SG 16 WP 3 and ISO/IEC JTC 1/SC 29/WG 11 15th Meeting: Gothenburg, SE, Jul. 3-12, 2019, 3 pages.

Document: JVET-O0134-v2, Chang, T., et al., "AHG8: Support for Reference Picture Resampling—Handling of Resampling," Joint Video Experts Team (JVET) of ITU-T SG 16 WP 3 and ISO/IEC JTC 1/SC 29/WG 11 15th Meeting: Gothenburg, SE, Jul. 3-12, 2019, 4 pages.

* cited by examiner

HANDLING OF MULTIPLE PICTURE SIZE AND CONFORMANCE WINDOWS FOR REFERENCE PICTURE RESAMPLING IN VIDEO CODING

CROSS-REFERENCE TO RELATED APPLICATIONS

This patent application is a continuation of International Application No. PCT/US2020/041026 filed on Jul. 7, 2020 by Futurewei Technologies, Inc., and titled "Handling of Multiple Picture Size and Conformance Windows for Reference Picture Resampling in Video Coding," which claims the benefit of U.S. Provisional Patent Application No. 62/871,493 filed Jul. 8, 2019, by Jianle Chen, et al., and titled "Handling of Multiple Picture Size and Conformance Windows for Reference Picture Resampling in Video Coding," which are hereby incorporated by reference.

TECHNICAL FIELD

In general, this disclosure describes techniques for supporting multiple picture size and conformance windows in video coding. More specifically, this disclosure ensures that picture parameter sets that have the same picture size also have the same conformance window.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

A first aspect relates to a method of decoding a coded video bitstream implemented by a video decoder. The method includes receiving, by the video decoder, a first picture parameter set and a second picture parameter set each referring to the same sequence parameter set, the first picture parameter set and the second picture parameter set having same values of a conformance window when the first picture parameter set and the second picture parameter set have same values of picture width and picture height; and applying, by the video decoder, the conformance window to a current picture corresponding to the first picture parameter set or the second picture parameter set.

The method provides techniques that constrain picture parameter sets that have the same picture size to also have the same conformance window size (e.g., cropping window size). By keeping the conformance window the same size for picture parameter sets having the same picture size, overly complex processing may be avoided when reference picture resampling (RPR) is enabled. Thus, usage of the processor, memory, and/or network resources may be reduced at both the encoder and the decoder. Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides that the conformance window comprises a conformance window left offset, a conformance window right offset, a conformance window top offset, and a conformance window bottom offset.

Optionally, in any of the preceding aspects, another implementation of the aspect provides decoding the current picture corresponding to the first picture parameter set or the second picture parameter set using inter prediction after the conformance window has been applied, wherein the inter prediction is based on a resampled reference picture.

Optionally, in any of the preceding aspects, another implementation of the aspect provides resampling a reference picture associated with the current picture corresponding to the first picture set or the second picture set using reference picture resampling (RPS).

Optionally, in any of the preceding aspects, another implementation of the aspect provides that the resampling of the reference picture changes a resolution of the reference picture used to inter predict the current picture corresponding to the first picture set or the second picture set.

Optionally, in any of the preceding aspects, another implementation of the aspect provides that the picture width and picture height are measured in luma samples.

Optionally, in any of the preceding aspects, another implementation of the aspect provides determining whether bi-direction optical flow (BDOF) is enabled for decoding the picture based on the picture width, the picture height, and the conformance window of the current picture and a reference picture for the current picture.

Optionally, in any of the preceding aspects, another implementation of the aspect provides determining whether decoder-side motion vector refinement (DMVR) is enabled for decoding the picture based on the picture width, the picture height, and the conformance window of the current picture and a reference picture for the current picture.

Optionally, in any of the preceding aspects, another implementation of the aspect provides displaying on a display of an electronic device an image generated using the current block.

A second aspect relates to a method of encoding a video bitstream implemented by a video encoder. The method includes generating, by the video encoder, a first picture parameter set and a second picture parameter set each referring to the same sequence parameter set, the first picture parameter set and the second picture parameter set having same values of a conformance window when the first picture parameter set and the second picture parameter set have same values of picture width and picture height; encoding, by the video encoder, the first picture parameter set and the second picture parameter set into a video bitstream; and storing, by the video encoder, the video bitstream for transmission toward a video decoder.

The method provides techniques that constrain picture parameter sets that have the same picture size to also have the same conformance window size (e.g., cropping window size). By keeping the conformance window the same size for picture parameter sets having the same picture size, overly complex processing may be avoided when reference picture resampling (RPR) is enabled. Thus, usage of the processor, memory, and/or network resources may be reduced at both the encoder and the decoder. Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides that the conformance window comprises a conformance window left offset, a conformance window right offset, a conformance window top offset, and a conformance window bottom offset.

Optionally, in any of the preceding aspects, another implementation of the aspect provides that the picture width and picture height are measured in luma samples.

Optionally, in any of the preceding aspects, another implementation of the aspect provides transmitting the video bitstream containing the first picture parameter set and the second picture parameter set toward the video decoder.

A third aspect relates to a decoding device. The decoding device includes a receiver configured to receive a coded video bitstream; a memory coupled to the receiver, the memory storing instructions; and a processor coupled to the memory, the processor configured to execute the instructions to cause the decoding device to: receive a first picture parameter set and a second picture parameter set each referring to the same sequence parameter set, the first picture parameter set and the second picture parameter set having same values of a conformance window when the first picture parameter set and the second picture parameter set have same values of picture width and picture height; and apply the conformance window to a current picture corresponding to the first picture parameter set or the second picture parameter set.

The decoding device provides techniques that constrain picture parameter sets that have the same picture size to also have the same conformance window size (e.g., cropping window size). By keeping the conformance window the same size for picture parameter sets having the same picture size, overly complex processing may be avoided when reference picture resampling (RPR) is enabled. Thus, usage of the processor, memory, and/or network resources may be reduced at both the encoder and the decoder. Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides the conformance window comprises a conformance window left offset, a conformance window right offset, a conformance window top offset, and a conformance window bottom offset.

Optionally, in any of the preceding aspects, another implementation of the aspect provides decoding the current picture corresponding to the first picture parameter set or the second picture parameter set using inter prediction after the conformance window has been applied, wherein the inter prediction is based on a resampled reference picture.

Optionally, in any of the preceding aspects, another implementation of the aspect provides a display configured to display an image generated based on the current picture.

A fourth aspect relates to an encoding device. The encoding device includes a memory containing instructions; a processor coupled to the memory, the processor configured to implement the instructions to cause the encoding device to: generate a first picture parameter set and a second picture parameter set each referring to the same sequence parameter set, the first picture parameter set and the second picture parameter set having same values of a conformance window when the first picture parameter set and the second picture parameter set have same values of picture width and picture height; and encode the first picture parameter set and the second picture parameter set into a video bitstream; and a transmitter coupled to the processor, the transmitter configured to transmit the video bitstream containing the first picture parameter set and the second picture parameter set toward a video decoder.

The encoding device provides techniques that constrain picture parameter sets that have the same picture size to also have the same conformance window size (e.g., cropping window size). By keeping the conformance window the same size for picture parameter sets having the same picture size, overly complex processing may be avoided when reference picture resampling (RPR) is enabled. Thus, usage of the processor, memory, and/or network resources may be reduced at both the encoder and the decoder. Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides the conformance window comprises a conformance window left offset, a conformance window right offset, a conformance window top offset, and a conformance window bottom offset.

Optionally, in any of the preceding aspects, another implementation of the aspect provides the picture width and picture height are measured in luma samples.

A fifth aspect relates to a coding apparatus. The coding apparatus includes a receiver configured to receive a picture to encode or to receive a bitstream to decode; a transmitter coupled to the receiver, the transmitter configured to transmit the bitstream to a decoder or to transmit a decoded image to a display; a memory coupled to at least one of the receiver or the transmitter, the memory configured to store instructions; and a processor coupled to the memory, the processor configured to execute the instructions stored in the memory to perform any of the methods disclosed herein.

The coding apparatus provides techniques that constrain picture parameter sets that have the same picture size to also have the same conformance window size (e.g., cropping window size). By keeping the conformance window the same size for picture parameter sets having the same picture size, overly complex processing may be avoided when reference picture resampling (RPR) is enabled. Thus, usage of the processor, memory, and/or network resources may be reduced at both the encoder and the decoder. Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides a display configured to display an image.

A sixth aspect relates to a system. The system includes an encoder; and a decoder in communication with the encoder, wherein the encoder or the decoder includes the decoding device, the encoding device, or the coding apparatus disclosed herein.

The system provides techniques that constrain picture parameter sets that have the same picture size to also have the same conformance window size (e.g., cropping window size). By keeping the conformance window the same size for picture parameter sets having the same picture size, overly complex processing may be avoided when reference picture resampling (RPR) is enabled. Thus, usage of the processor, memory, and/or network resources may be reduced at both the encoder and the decoder. Thus, the coder/decoder (a.k.a., "codec") in video coding is improved relative to current codecs. As a practical matter, the improved video coding process offers the user a better user experience when videos are sent, received, and/or viewed.

A seventh aspect relates to a means for coding. The means for coding includes receiving means configured to receive a picture to encode or to receive a bitstream to decode; transmission means coupled to the receiving means, the transmission means configured to transmit the bitstream to a decoding means or to transmit a decoded image to a display means; storage means coupled to at least one of the receiving means or the transmission means, the storage means configured to store instructions; and processing means coupled to the storage means, the processing means configured to execute the instructions stored in the storage means to perform any of the methods disclosed herein.

The means for coding provides techniques that constrain picture parameter sets that have the same picture size to also have the same conformance window size (e.g., cropping window size). By keeping the conformance window the same size for picture parameter sets having the same picture size, overly complex processing may be avoided when reference picture resampling (RPR) is enabled. Thus, usage of the processor, memory, and/or network resources may be reduced at both the encoder and the decoder. Thus, the coder/decoder (a.k.a., "codec") in video coding is improved relative to current codecs. As a practical matter, the improved video coding process offers the user a better user experience when videos are sent, received, and/or viewed.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
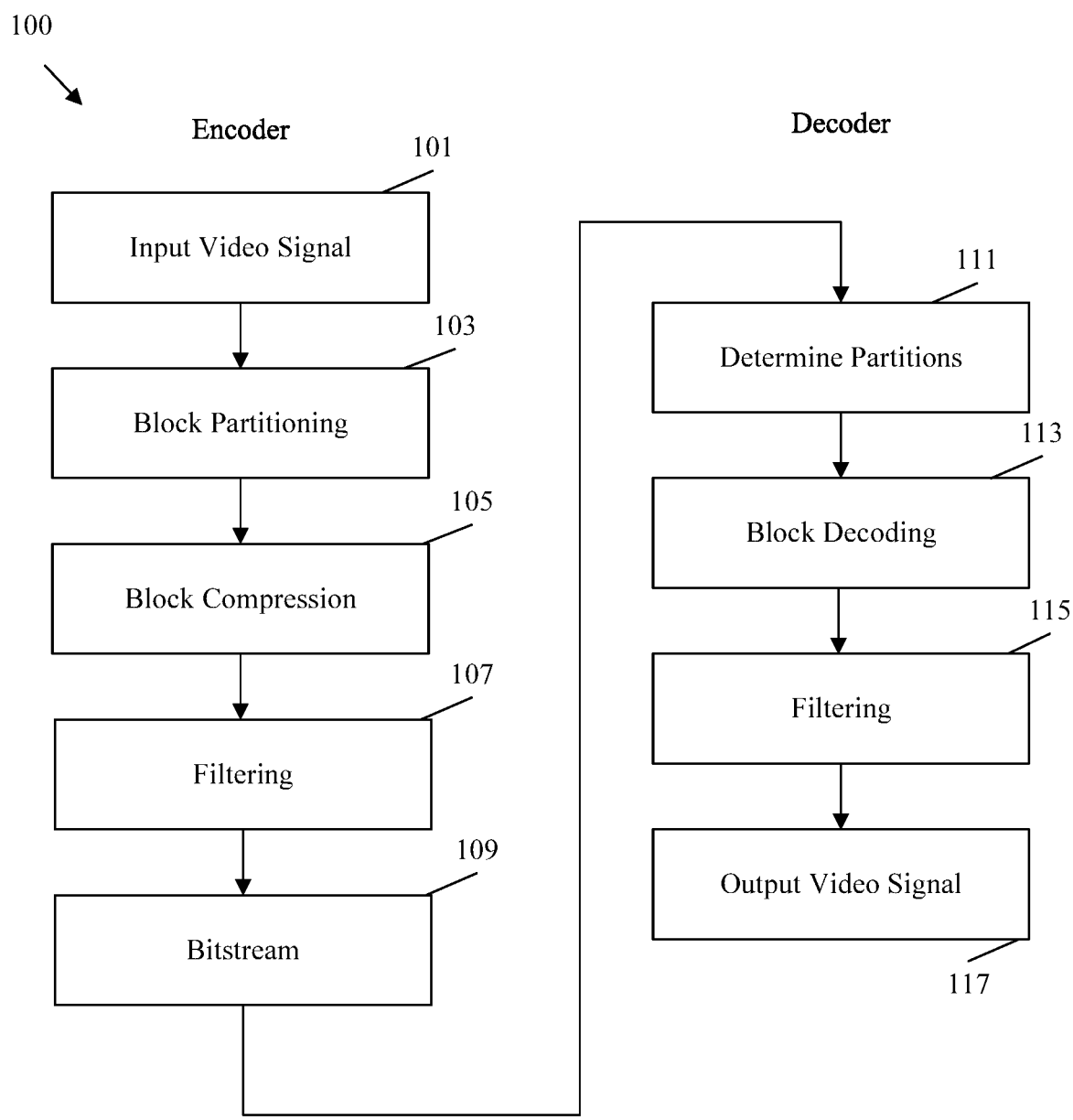
FIG. 1 is a flowchart of an example method of coding a video signal.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following terms are defined as follows unless used in a contrary context herein. Specifically, the following definitions are intended to provide additional clarity to the present disclosure. However, terms may be described differently in different contexts. Accordingly, the following definitions should be considered as a supplement and should not be considered to limit any other definitions of descriptions provided for such terms herein.

A bitstream is a sequence of bits including video data that is compressed for transmission between an encoder and a decoder. An encoder is a device that is configured to employ encoding processes to compress video data into a bitstream. A decoder is a device that is configured to employ decoding processes to reconstruct video data from a bitstream for display. A picture is an array of luma samples and/or an array of chroma samples that create a frame or a field thereof. A picture that is being encoded or decoded can be referred to as a current picture for clarity of discussion.

A reference picture is a picture that contains reference samples that can be used when coding other pictures by reference according to inter-prediction and/or inter-layer prediction. A reference picture list is a list of reference pictures used for inter-prediction and/or inter-layer prediction. Some video coding systems utilize two reference picture lists, which can be denoted as reference picture list one and reference picture list zero. A reference picture list structure is an addressable syntax structure that contains multiple reference picture lists. Inter-prediction is a mechanism of coding samples of a current picture by reference to indicated samples in a reference picture that is different from the current picture where the reference picture and the current picture are in the same layer. A reference picture list structure entry is an addressable location in a reference picture list structure that indicates a reference picture associated with a reference picture list.

A slice header is a part of a coded slice containing data elements pertaining to all video data within a tile represented in the slice. A picture parameter set (PPS) is a parameter set that contains data related to an entire picture. More specifically, the PPS is a syntax structure containing syntax elements that apply to zero or more entire coded pictures as determined by a syntax element found in each picture header. A sequence parameter set (SPS) is a parameter set that contains data related to a sequence of pictures. An access unit (AU) is a set of one or more coded pictures associated with the same display time (e.g., the same picture order count) for output from a decoded picture buffer (DPB) (e.g., for display to a user). A decoded video sequence is a sequence of pictures that have been reconstructed by a decoder in preparation for display to a user.

A conformance cropping window (or simply, conformance window) refers to a window of samples of a picture in a coded video sequence output from a coding process. A bitstream may provide conformance window cropping parameters to indicate the output region of the coded picture. A picture width is a width of the picture measured in luma samples. A picture height is a height of the picture measured in luma samples. A conformance window offsets (e.g., conf_win_left_offset, conf_win_right_offset, conf_win_top_offset, and conf_win_bottom_offset) specify the samples of the pictures referencing the PPS that are output from the decoding process, in terms of a rectangular region specified in picture coordinates for output.

Decoder-Side Motion Vector Refinement (DMVR) is a process, algorithm, or coding tool used to refine motion or motion vectors for a predicted block. DMVR allows a motion vector to be found based on two motion vectors found for bi-prediction using a bilateral template matching process. In DMVR, a weighted combination of prediction coding units generated with each of the two motion vectors can be found, and the two motion vectors can be refined by replacing them with new motion vectors that best point to the combined prediction coding unit. Bi-direction optical flow (BDOF) is a process, algorithm, or coding tool used to refine motion or motion vectors for a predicted block. BDOF allows motion vectors to be found for sub-coding units based on the gradient of the difference between the two reference pictures.

Reference picture resampling (RPR) is the ability to change the spatial resolution of coded pictures in the middle of a bitstream without the need of intra-coding of the picture at the resolution-changing location. As used herein, resolution describes the number of pixels in a video file. That is, the resolution is the width and height of the projected image, measured in pixels. For example, a video might have a resolution of 1280 (horizontal pixels)×720 (vertical pixels). This is usually written as simply 1280×720, or abbreviated to 720 p.

As used herein, resolution describes the number of pixels in a video file. That is, the resolution is the width and height of the projected image, measured in pixels. For example, a video might have a resolution of 1280 (horizontal pixels)× 720 (vertical pixels). This is usually written as simply 1280×720, or abbreviated to 720 p. Decoder-side motion vector refinement (DMVR) is a process, algorithm, or coding tool used to refine motion or motion vectors for a predicted block. Bi-direction optical flow (BDOF), which is also known as bi-directional optical flow (BIO), is a process, algorithm, or coding tool used to refine motion or motion vectors for a predicted block. The reference picture resampling (RPR) feature is the ability to change the spatial resolution of coded pictures in the middle of a bitstream without the need of intra-coding of the picture at the resolution-changing location.

The following acronyms are used herein, Coding Tree Block (CTB), Coding Tree Unit (CTU), Coding Unit (CU), Coded Video Sequence (CVS), Joint Video Experts Team (JVET), Motion-Constrained Tile Set (MCTS), Maximum Transfer Unit (MTU), Network Abstraction Layer (NAL), Picture Order Count (POC), Raw Byte Sequence Payload (RBSP), Sequence Parameter Set (SPS), Versatile Video Coding (VVC), and Working Draft (WD).

FIG. 1 is a flowchart of an example operating method 100 of coding a video signal. Specifically, a video signal is encoded at an encoder. The encoding process compresses the video signal by employing various mechanisms to reduce the video file size. A smaller file size allows the compressed video file to be transmitted toward a user, while reducing associated bandwidth overhead. The decoder then decodes the compressed video file to reconstruct the original video signal for display to an end user. The decoding process generally mirrors the encoding process to allow the decoder to consistently reconstruct the video signal.

At step 101, the video signal is input into the encoder. For example, the video signal may be an uncompressed video file stored in memory. As another example, the video file may be captured by a video capture device, such as a video camera, and encoded to support live streaming of the video. The video file may include both an audio component and a video component. The video component contains a series of image frames that, when viewed in a sequence, gives the visual impression of motion. The frames contain pixels that are expressed in terms of light, referred to herein as luma components (or luma samples), and color, which is referred to as chroma components (or color samples). In some examples, the frames may also contain depth values to support three dimensional viewing.

At step 103, the video is partitioned into blocks. Partitioning includes subdividing the pixels in each frame into square and/or rectangular blocks for compression. For example, in High Efficiency Video Coding (HEVC) (also known as H.265 and MPEG-H Part 2) the frame can first be divided into coding tree units (CTUs), which are blocks of a predefined size (e.g., sixty-four pixels by sixty-four pixels). The CTUs contain both luma and chroma samples. Coding trees may be employed to divide the CTUs into blocks and then recursively subdivide the blocks until configurations are achieved that support further encoding. For example, luma components of a frame may be subdivided until the individual blocks contain relatively homogenous lighting values. Further, chroma components of a frame may be subdivided until the individual blocks contain relatively homogenous color values. Accordingly, partitioning mechanisms vary depending on the content of the video frames.

At step 105, various compression mechanisms are employed to compress the image blocks partitioned at step 103. For example, inter-prediction and/or intra-prediction may be employed. Inter-prediction is designed to take advantage of the fact that objects in a common scene tend to appear in successive frames. Accordingly, a block depicting an object in a reference frame need not be repeatedly described in adjacent frames. Specifically, an object, such as a table, may remain in a constant position over multiple frames. Hence the table is described once and adjacent frames can refer back to the reference frame. Pattern matching mechanisms may be employed to match objects over multiple frames. Further, moving objects may be represented across multiple frames, for example due to object movement or camera movement. As a particular example, a video may show an automobile that moves across the screen over multiple frames. Motion vectors can be employed to describe such movement. A motion vector is a two-dimensional vector that provides an offset from the coordinates of an object in a frame to the coordinates of the object in a reference frame. As such, inter-prediction can encode an image block in a current frame as a set of motion vectors indicating an offset from a corresponding block in a reference frame.

Intra-prediction encodes blocks in a common frame. Intra-prediction takes advantage of the fact that luma and chroma components tend to cluster in a frame. For example, a patch of green in a portion of a tree tends to be positioned adjacent to similar patches of green. Intra-prediction employs multiple directional prediction modes (e.g., thirty-three in HEVC), a planar mode, and a direct current (DC) mode. The directional modes indicate that a current block is similar/the same as samples of a neighbor block in a corresponding direction. Planar mode indicates that a series of blocks along a row/column (e.g., a plane) can be interpolated based on neighbor blocks at the edges of the row. Planar mode, in effect, indicates a smooth transition of light/color across a row/column by employing a relatively constant slope in changing values. DC mode is employed for boundary smoothing and indicates that a block is similar/the same as an average value associated with samples of all the neighbor blocks associated with the angular directions of the directional prediction modes. Accordingly, intra-prediction blocks can represent image blocks as various relational prediction mode values instead of the actual values. Further, inter-prediction blocks can represent image blocks as motion vector values instead of the actual values. In either case, the prediction blocks may not exactly represent the image blocks in some cases. Any differences are stored in residual blocks. Transforms may be applied to the residual blocks to further compress the file.

At step 107, various filtering techniques may be applied. In HEVC, the filters are applied according to an in-loop filtering scheme. The block based prediction discussed above may result in the creation of blocky images at the decoder. Further, the block based prediction scheme may encode a block and then reconstruct the encoded block for later use as a reference block. The in-loop filtering scheme iteratively applies noise suppression filters, de-blocking filters, adaptive loop filters, and sample adaptive offset (SAO) filters to the blocks/frames. These filters mitigate such blocking artifacts so that the encoded file can be accurately reconstructed. Further, these filters mitigate artifacts in the reconstructed reference blocks so that artifacts are less likely to create additional artifacts in subsequent blocks that are encoded based on the reconstructed reference blocks.

Once the video signal has been partitioned, compressed, and filtered, the resulting data is encoded in a bitstream at step 109. The bitstream includes the data discussed above as well as any signaling data desired to support proper video signal reconstruction at the decoder. For example, such data may include partition data, prediction data, residual blocks, and various flags providing coding instructions to the decoder. The bitstream may be stored in memory for transmission toward a decoder upon request. The bitstream may also be broadcast and/or multicast toward a plurality of decoders. The creation of the bitstream is an iterative process. Accordingly, steps 101, 103, 105, 107, and 109 may occur continuously and/or simultaneously over many frames and blocks. The order shown in FIG. 1 is presented for clarity and ease of discussion, and is not intended to limit the video coding process to a particular order.

The decoder receives the bitstream and begins the decoding process at step 111. Specifically, the decoder employs an entropy decoding scheme to convert the bitstream into corresponding syntax and video data. The decoder employs the syntax data from the bitstream to determine the partitions for the frames at step 111. The partitioning should match the results of block partitioning at step 103. Entropy encoding/decoding as employed in step 111 is now described. The encoder makes many choices during the compression process, such as selecting block partitioning schemes from several possible choices based on the spatial positioning of values in the input image(s). Signaling the exact choices may employ a large number of bins. As used herein, a bin is a binary value that is treated as a variable (e.g., a bit value that may vary depending on context). Entropy coding allows the encoder to discard any options that are clearly not viable for a particular case, leaving a set of allowable options. Each allowable option is then assigned a code word. The length of the code words is based on the number of allowable options (e.g., one bin for two options, two bins for three to four options, etc.) The encoder then encodes the code word for the selected option. This scheme reduces the size of the code words as the code words are as big as desired to uniquely indicate a selection from a small sub-set of allowable options as opposed to uniquely indicating the selection from a potentially large set of all possible options. The decoder then decodes the selection by determining the set of allowable options in a similar manner to the encoder. By determining the set of allowable options, the decoder can read the code word and determine the selection made by the encoder.

At step 113, the decoder performs block decoding. Specifically, the decoder employs reverse transforms to generate residual blocks. Then the decoder employs the residual blocks and corresponding prediction blocks to reconstruct the image blocks according to the partitioning. The prediction blocks may include both intra-prediction blocks and inter-prediction blocks as generated at the encoder at step 105. The reconstructed image blocks are then positioned into frames of a reconstructed video signal according to the partitioning data determined at step 111. Syntax for step 113 may also be signaled in the bitstream via entropy coding as discussed above.

At step 115, filtering is performed on the frames of the reconstructed video signal in a manner similar to step 107 at the encoder. For example, noise suppression filters, de-blocking filters, adaptive loop filters, and SAO filters may be applied to the frames to remove blocking artifacts. Once the frames are filtered, the video signal can be output to a display at step 117 for viewing by an end user.

Figure 2:
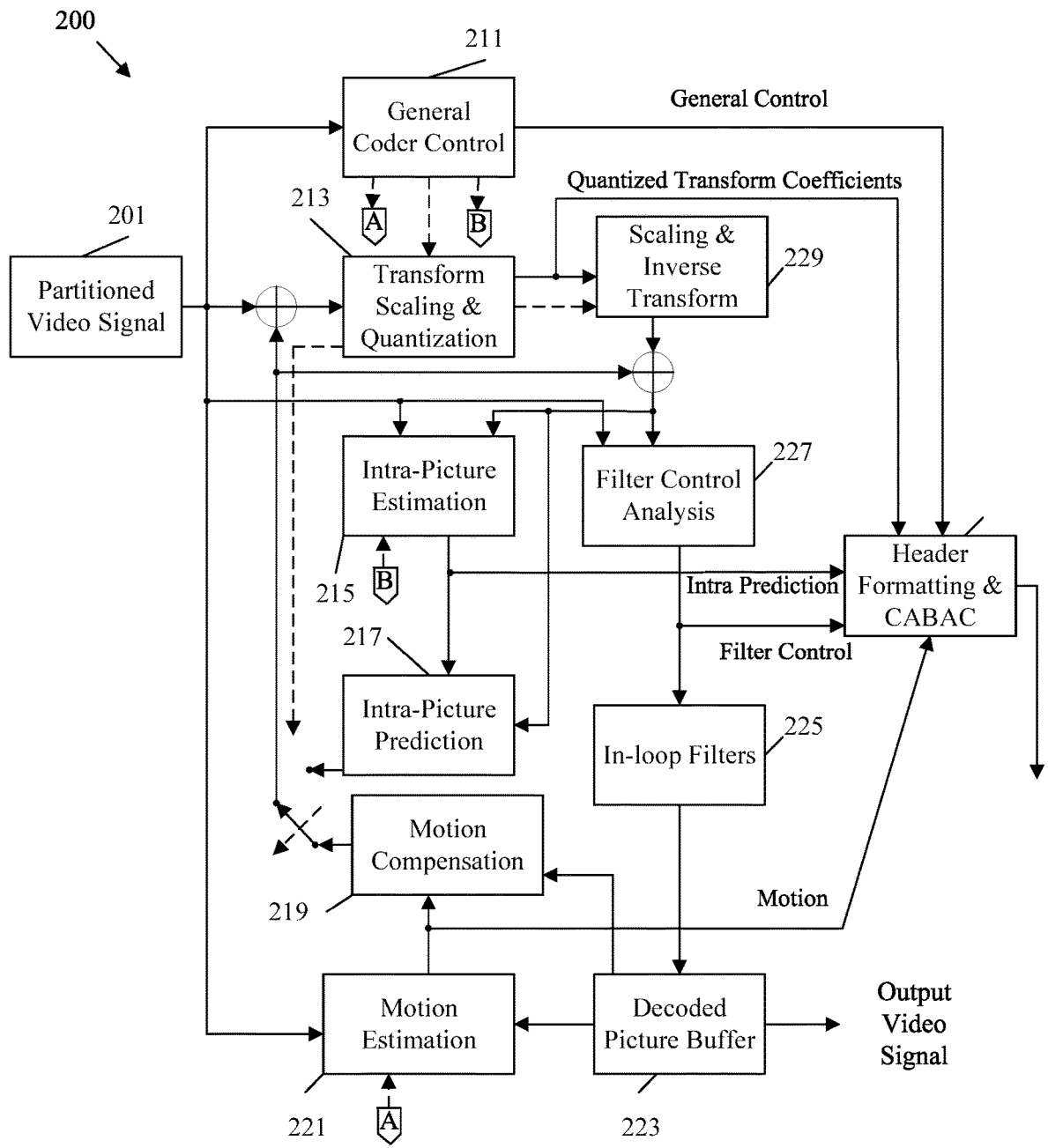
FIG. 2 is a schematic diagram of an example coding and decoding (codec) system for video coding.

FIG. 2 is a schematic diagram of an example coding and decoding (codec) system 200 for video coding. Specifically, codec system 200 provides functionality to support the implementation of operating method 100. Codec system 200 is generalized to depict components employed in both an encoder and a decoder. Codec system 200 receives and partitions a video signal as discussed with respect to steps 101 and 103 in operating method 100, which results in a partitioned video signal 201. Codec system 200 then compresses the partitioned video signal 201 into a coded bitstream when acting as an encoder as discussed with respect to steps 105, 107, and 109 in method 100. When acting as a decoder, codec system 200 generates an output video signal from the bitstream as discussed with respect to steps 111, 113, 115, and 117 in operating method 100. The codec system 200 includes a general coder control component 211, a transform scaling and quantization component 213, an intra-picture estimation component 215, an intra-picture prediction component 217, a motion compensation component 219, a motion estimation component 221, a scaling and inverse transform component 229, a filter control analysis component 227, an in-loop filters component 225, a decoded picture buffer component 223, and a header formatting and context adaptive binary arithmetic coding (CABAC) component 231. Such components are coupled as shown. In FIG. 2, black lines indicate movement of data to be encoded/ decoded while dashed lines indicate movement of control data that controls the operation of other components. The components of codec system 200 may all be present in the encoder. The decoder may include a subset of the components of codec system 200. For example, the decoder may include the intra-picture prediction component 217, the motion compensation component 219, the scaling and inverse transform component 229, the in-loop filters component 225, and the decoded picture buffer component 223. These components are now described.

The partitioned video signal 201 is a captured video sequence that has been partitioned into blocks of pixels by a coding tree. A coding tree employs various split modes to subdivide a block of pixels into smaller blocks of pixels. These blocks can then be further subdivided into smaller blocks. The blocks may be referred to as nodes on the coding tree. Larger parent nodes are split into smaller child nodes. The number of times a node is subdivided is referred to as the depth of the node/coding tree. The divided blocks can be included in coding units (CUs) in some cases. For example, a CU can be a sub-portion of a CTU that contains a luma block, red difference chroma (Cr) block(s), and a blue difference chroma (Cb) block(s) along with corresponding syntax instructions for the CU. The split modes may include a binary tree (BT), triple tree (TT), and a quad tree (QT) employed to partition a node into two, three, or four child nodes, respectively, of varying shapes depending on the split modes employed. The partitioned video signal 201 is forwarded to the general coder control component 211, the transform scaling and quantization component 213, the intra-picture estimation component 215, the filter control analysis component 227, and the motion estimation component 221 for compression.

The general coder control component 211 is configured to make decisions related to coding of the images of the video sequence into the bitstream according to application constraints. For example, the general coder control component 211 manages optimization of bitrate/bitstream size versus reconstruction quality. Such decisions may be made based on storage space/bandwidth availability and image resolution requests. The general coder control component 211 also manages buffer utilization in light of transmission speed to mitigate buffer underrun and overrun issues. To manage these issues, the general coder control component 211 manages partitioning, prediction, and filtering by the other components. For example, the general coder control component 211 may dynamically increase compression complexity to increase resolution and increase bandwidth usage or decrease compression complexity to decrease resolution and bandwidth usage. Hence, the general coder control component 211 controls the other components of codec system 200 to balance video signal reconstruction quality with bit rate concerns. The general coder control component 211 creates control data, which controls the operation of the other components. The control data is also forwarded to the header formatting and CABAC component 231 to be encoded in the bitstream to signal parameters for decoding at the decoder.

The partitioned video signal 201 is also sent to the motion estimation component 221 and the motion compensation component 219 for inter-prediction. A frame or slice of the partitioned video signal 201 may be divided into multiple video blocks. Motion estimation component 221 and the motion compensation component 219 perform inter-predictive coding of the received video block relative to one or more blocks in one or more reference frames to provide temporal prediction. Codec system 200 may perform multiple coding passes, e.g., to select an appropriate coding mode for each block of video data.

Motion estimation component 221 and motion compensation component 219 may be highly integrated, but are illustrated separately for conceptual purposes. Motion estimation, performed by motion estimation component 221, is the process of generating motion vectors, which estimate motion for video blocks. A motion vector, for example, may indicate the displacement of a coded object relative to a predictive block. A predictive block is a block that is found to closely match the block to be coded, in terms of pixel difference. A predictive block may also be referred to as a reference block. Such pixel difference may be determined by sum of absolute difference (SAD), sum of square difference (SSD), or other difference metrics. HEVC employs several coded objects including a CTU, coding tree blocks (CTBs), and CUs. For example, a CTU can be divided into CTBs, which can then be divided into CBs for inclusion in CUs. A CU can be encoded as a prediction unit (PU) containing prediction data and/or a transform unit (TU) containing transformed residual data for the CU. The motion estimation component 221 generates motion vectors, PUs, and TUs by using a rate-distortion analysis as part of a rate distortion optimization process. For example, the motion estimation component 221 may determine multiple reference blocks, multiple motion vectors, etc. for a current block/frame, and may select the reference blocks, motion vectors, etc. having the best rate-distortion characteristics. The best rate-distortion characteristics balance both quality of video reconstruction (e.g., amount of data loss by compression) with coding efficiency (e.g., size of the final encoding).

In some examples, codec system 200 may calculate values for sub-integer pixel positions of reference pictures stored in decoded picture buffer component 223. For example, video codec system 200 may interpolate values of one-quarter pixel positions, one-eighth pixel positions, or other fractional pixel positions of the reference picture. Therefore, motion estimation component 221 may perform a motion search relative to the full pixel positions and fractional pixel positions and output a motion vector with fractional pixel precision. The motion estimation component 221 calculates a motion vector for a PU of a video block in an inter-coded slice by comparing the position of the PU to the position of a predictive block of a reference picture. Motion estimation component 221 outputs the calculated motion vector as motion data to header formatting and CABAC component 231 for encoding and motion to the motion compensation component 219.

Motion compensation, performed by motion compensation component 219, may involve fetching or generating the predictive block based on the motion vector determined by motion estimation component 221. Again, motion estimation component 221 and motion compensation component 219 may be functionally integrated, in some examples. Upon receiving the motion vector for the PU of the current video block, motion compensation component 219 may locate the predictive block to which the motion vector points. A residual video block is then formed by subtracting pixel values of the predictive block from the pixel values of the current video block being coded, forming pixel difference values. In general, motion estimation component 221 performs motion estimation relative to luma components, and motion compensation component 219 uses motion vectors calculated based on the luma components for both chroma components and luma components. The predictive block and residual block are forwarded to transform scaling and quantization component 213.

The partitioned video signal 201 is also sent to intra-picture estimation component 215 and intra-picture prediction component 217. As with motion estimation component 221 and motion compensation component 219, intra-picture estimation component 215 and intra-picture prediction component 217 may be highly integrated, but are illustrated separately for conceptual purposes. The intra-picture estimation component 215 and intra-picture prediction component 217 intra-predict a current block relative to blocks in a current frame, as an alternative to the inter-prediction performed by motion estimation component 221 and motion compensation component 219 between frames, as described above. In particular, the intra-picture estimation component 215 determines an intra-prediction mode to use to encode a current block. In some examples, intra-picture estimation component 215 selects an appropriate intra-prediction mode to encode a current block from multiple tested intra-prediction modes. The selected intra-prediction modes are then forwarded to the header formatting and CABAC component 231 for encoding.

For example, the intra-picture estimation component 215 calculates rate-distortion values using a rate-distortion analysis for the various tested intra-prediction modes, and selects the intra-prediction mode having the best rate-distortion characteristics among the tested modes. Rate-distortion analysis generally determines an amount of distortion (or error) between an encoded block and an original unencoded block that was encoded to produce the encoded block, as well as a bitrate (e.g., a number of bits) used to produce the encoded block. The intra-picture estimation component 215 calculates ratios from the distortions and rates for the various encoded blocks to determine which intra-prediction mode exhibits the best rate-distortion value for the block. In addition, intra-picture estimation component 215 may be configured to code depth blocks of a depth map using a depth modeling mode (DMM) based on rate-distortion optimization (RDO).

The intra-picture prediction component 217 may generate a residual block from the predictive block based on the selected intra-prediction modes determined by intra-picture estimation component 215 when implemented on an encoder or read the residual block from the bitstream when implemented on a decoder. The residual block includes the difference in values between the predictive block and the original block, represented as a matrix. The residual block is then forwarded to the transform scaling and quantization component 213. The intra-picture estimation component 215 and the intra-picture prediction component 217 may operate on both luma and chroma components.

The transform scaling and quantization component 213 is configured to further compress the residual block. The transform scaling and quantization component 213 applies a transform, such as a discrete cosine transform (DCT), a discrete sine transform (DST), or a conceptually similar transform, to the residual block, producing a video block comprising residual transform coefficient values. Wavelet transforms, integer transforms, sub-band transforms or other types of transforms could also be used. The transform may convert the residual information from a pixel value domain to a transform domain, such as a frequency domain. The transform scaling and quantization component 213 is also configured to scale the transformed residual information, for example based on frequency. Such scaling involves applying a scale factor to the residual information so that different frequency information is quantized at different granularities, which may affect final visual quality of the reconstructed video. The transform scaling and quantization component 213 is also configured to quantize the transform coefficients to further reduce bit rate. The quantization process may reduce the bit depth associated with some or all of the coefficients. The degree of quantization may be modified by adjusting a quantization parameter. In some examples, the transform scaling and quantization component 213 may then perform a scan of the matrix including the quantized transform coefficients. The quantized transform coefficients are forwarded to the header formatting and CABAC component 231 to be encoded in the bitstream.

The scaling and inverse transform component 229 applies a reverse operation of the transform scaling and quantization component 213 to support motion estimation. The scaling and inverse transform component 229 applies inverse scaling, transformation, and/or quantization to reconstruct the residual block in the pixel domain, e.g., for later use as a reference block which may become a predictive block for another current block. The motion estimation component 221 and/or motion compensation component 219 may calculate a reference block by adding the residual block back to a corresponding predictive block for use in motion estimation of a later block/frame. Filters are applied to the reconstructed reference blocks to mitigate artifacts created during scaling, quantization, and transform. Such artifacts could otherwise cause inaccurate prediction (and create additional artifacts) when subsequent blocks are predicted.

The filter control analysis component 227 and the in-loop filters component 225 apply the filters to the residual blocks and/or to reconstructed image blocks. For example, the transformed residual block from the scaling and inverse transform component 229 may be combined with a corresponding prediction block from intra-picture prediction component 217 and/or motion compensation component 219 to reconstruct the original image block. The filters may then be applied to the reconstructed image block. In some examples, the filters may instead be applied to the residual blocks. As with other components in FIG. 2, the filter control analysis component 227 and the in-loop filters component 225 are highly integrated and may be implemented together, but are depicted separately for conceptual purposes. Filters applied to the reconstructed reference blocks are applied to particular spatial regions and include multiple parameters to adjust how such filters are applied. The filter control analysis component 227 analyzes the reconstructed reference blocks to determine where such filters should be applied and sets corresponding parameters. Such data is forwarded to the header formatting and CABAC component 231 as filter control data for encoding. The in-loop filters component 225 applies such filters based on the filter control data. The filters may include a deblocking filter, a noise suppression filter, a SAO filter, and an adaptive loop filter. Such filters may be applied in the spatial/pixel domain (e.g., on a reconstructed pixel block) or in the frequency domain, depending on the example.

When operating as an encoder, the filtered reconstructed image block, residual block, and/or prediction block are stored in the decoded picture buffer component 223 for later use in motion estimation as discussed above. When operating as a decoder, the decoded picture buffer component 223 stores and forwards the reconstructed and filtered blocks toward a display as part of an output video signal. The decoded picture buffer component 223 may be any memory device capable of storing prediction blocks, residual blocks, and/or reconstructed image blocks.

The header formatting and CABAC component 231 receives the data from the various components of codec system 200 and encodes such data into a coded bitstream for transmission toward a decoder. Specifically, the header formatting and CABAC component 231 generates various headers to encode control data, such as general control data and filter control data. Further, prediction data, including intra-prediction and motion data, as well as residual data in the form of quantized transform coefficient data are all encoded in the bitstream. The final bitstream includes all information desired by the decoder to reconstruct the original partitioned video signal 201. Such information may also include intra-prediction mode index tables (also referred to as codeword mapping tables), definitions of encoding contexts for various blocks, indications of most probable intra-prediction modes, an indication of partition information, etc. Such data may be encoded by employing entropy coding. For example, the information may be encoded by employing context adaptive variable length coding (CAVLC), CABAC, syntax-based context-adaptive binary arithmetic coding (SBAC), probability interval partitioning entropy (PIPE) coding, or another entropy coding technique. Following the entropy coding, the coded bitstream may be transmitted to another device (e.g., a video decoder) or archived for later transmission or retrieval.

Figure 3:
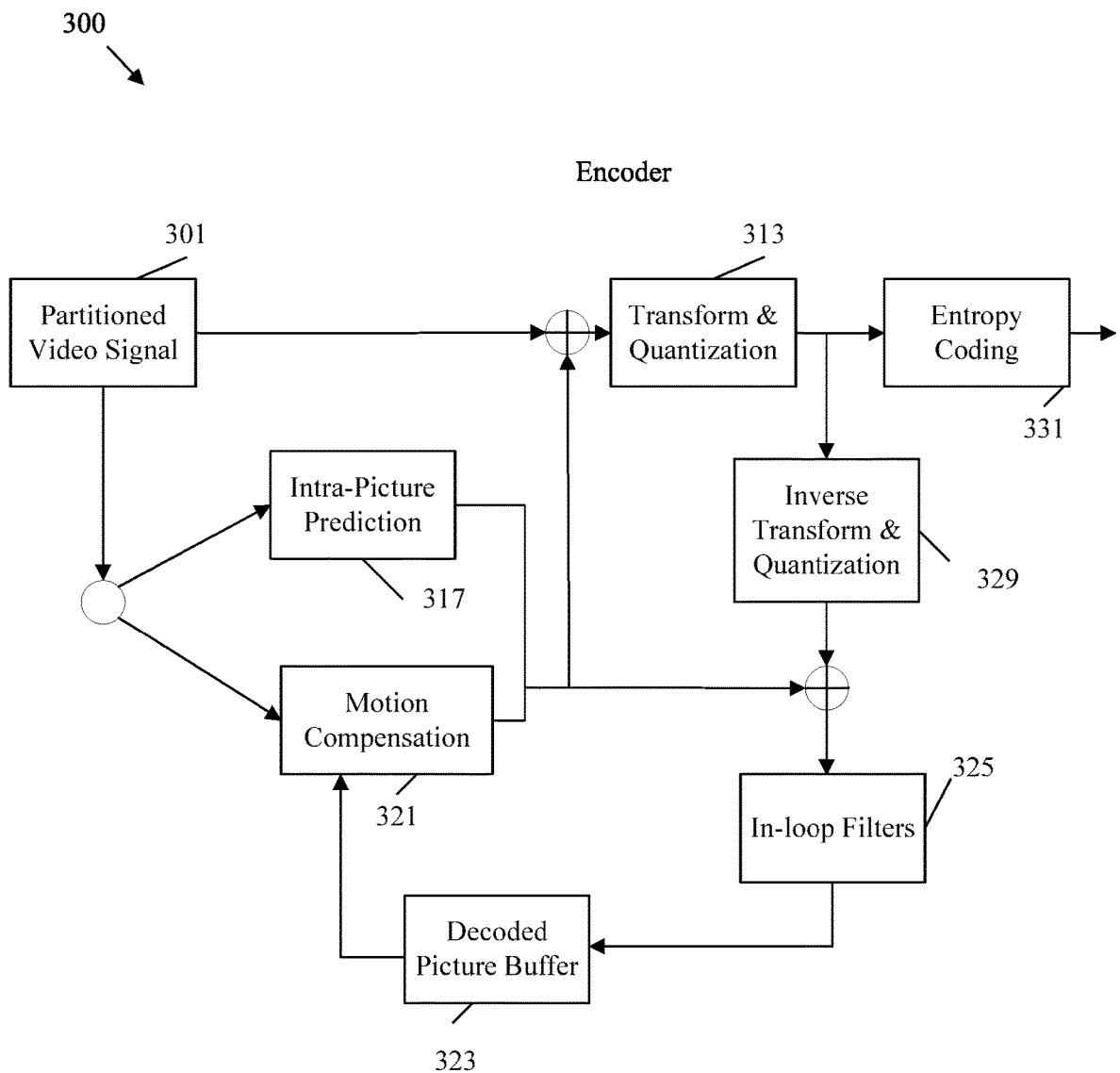
FIG. 3 is a schematic diagram illustrating an example video encoder.

FIG. 3 is a block diagram illustrating an example video encoder 300. Video encoder 300 may be employed to implement the encoding functions of codec system 200 and/or implement steps 101, 103, 105, 107, and/or 109 of operating method 100. Encoder 300 partitions an input video signal, resulting in a partitioned video signal 301, which is substantially similar to the partitioned video signal 201. The partitioned video signal 301 is then compressed and encoded into a bitstream by components of encoder 300.

Specifically, the partitioned video signal 301 is forwarded to an intra-picture prediction component 317 for intra-prediction. The intra-picture prediction component 317 may be substantially similar to intra-picture estimation component 215 and intra-picture prediction component 217. The partitioned video signal 301 is also forwarded to a motion compensation component 321 for inter-prediction based on reference blocks in a decoded picture buffer component 323. The motion compensation component 321 may be substantially similar to motion estimation component 221 and motion compensation component 219. The prediction blocks and residual blocks from the intra-picture prediction component 317 and the motion compensation component 321 are forwarded to a transform and quantization component 313 for transform and quantization of the residual blocks. The transform and quantization component 313 may be substantially similar to the transform scaling and quantization component 213. The transformed and quantized residual blocks and the corresponding prediction blocks (along with associated control data) are forwarded to an entropy coding component 331 for coding into a bitstream. The entropy coding component 331 may be substantially similar to the header formatting and CABAC component 231.

The transformed and quantized residual blocks and/or the corresponding prediction blocks are also forwarded from the transform and quantization component 313 to an inverse transform and quantization component 329 for reconstruction into reference blocks for use by the motion compensation component 321. The inverse transform and quantization component 329 may be substantially similar to the scaling and inverse transform component 229. In-loop filters in an in-loop filters component 325 are also applied to the residual blocks and/or reconstructed reference blocks, depending on the example. The in-loop filters component 325 may be substantially similar to the filter control analysis component 227 and the in-loop filters component 225. The in-loop filters component 325 may include multiple filters as discussed with respect to in-loop filters component 225. The filtered blocks are then stored in a decoded picture buffer component 323 for use as reference blocks by the motion compensation component 321. The decoded picture buffer component 323 may be substantially similar to the decoded picture buffer component 223.

Figure 4:
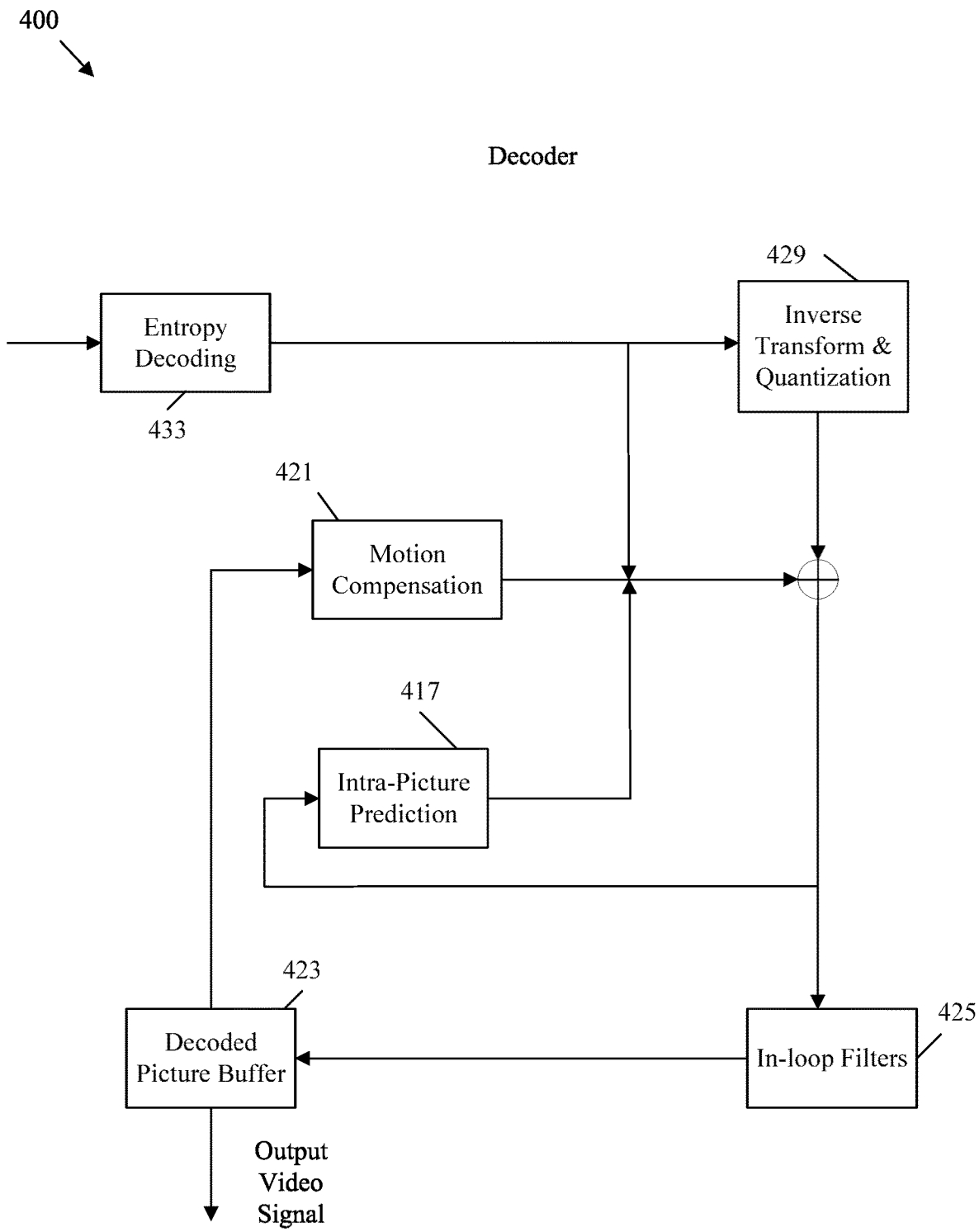
FIG. 4 is a schematic diagram illustrating an example video decoder.

FIG. 4 is a block diagram illustrating an example video decoder 400. Video decoder 400 may be employed to implement the decoding functions of codec system 200 and/or implement steps 111, 113, 115, and/or 117 of operating method 100. Decoder 400 receives a bitstream, for example from an encoder 300, and generates a reconstructed output video signal based on the bitstream for display to an end user.

The bitstream is received by an entropy decoding component 433. The entropy decoding component 433 is configured to implement an entropy decoding scheme, such as CAVLC, CABAC, SBAC, PIPE coding, or other entropy coding techniques. For example, the entropy decoding component 433 may employ header information to provide a context to interpret additional data encoded as codewords in the bitstream. The decoded information includes any desired information to decode the video signal, such as general control data, filter control data, partition information, motion data, prediction data, and quantized transform coefficients from residual blocks. The quantized transform coefficients are forwarded to an inverse transform and quantization component 429 for reconstruction into residual blocks. The inverse transform and quantization component 429 may be similar to inverse transform and quantization component 329.

The reconstructed residual blocks and/or prediction blocks are forwarded to intra-picture prediction component 417 for reconstruction into image blocks based on intra-prediction operations. The intra-picture prediction component 417 may be similar to intra-picture estimation component 215 and an intra-picture prediction component 217. Specifically, the intra-picture prediction component 417 employs prediction modes to locate a reference block in the frame and applies a residual block to the result to reconstruct intra-predicted image blocks. The reconstructed intra-predicted image blocks and/or the residual blocks and corresponding inter-prediction data are forwarded to a decoded picture buffer component 423 via an in-loop filters component 425, which may be substantially similar to decoded picture buffer component 223 and in-loop filters component 225, respectively. The in-loop filters component 425 filters the reconstructed image blocks, residual blocks and/or prediction blocks, and such information is stored in the decoded picture buffer component 423. Reconstructed image blocks from decoded picture buffer component 423 are forwarded to a motion compensation component 421 for inter-prediction. The motion compensation component 421 may be substantially similar to motion estimation component 221 and/or motion compensation component 219. Specifically, the motion compensation component 421 employs motion vectors from a reference block to generate a prediction block and applies a residual block to the result to reconstruct an image block. The resulting reconstructed blocks may also be forwarded via the in-loop filters component 425 to the decoded picture buffer component 423. The decoded picture buffer component 423 continues to store additional reconstructed image blocks, which can be reconstructed into frames via the partition information. Such frames may also be placed in a sequence. The sequence is output toward a display as a reconstructed output video signal.

Keeping the above in mind, video compression techniques perform spatial (intra-picture) prediction and/or temporal (inter-picture) prediction to reduce or remove redundancy inherent in video sequences. For block-based video coding, a video slice (i.e., a video picture or a portion of a video picture) may be partitioned into video blocks, which may also be referred to as treeblocks, coding tree blocks (CTBs), coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

Image and video compression has experienced rapid growth, leading to various coding standards. Such video coding standards include ITU-T H.261, International Organization for Standardization/International Electrotechnical Commission (ISO/IEC) MPEG-1 Part 2, ITU-T H.262 or ISO/IEC MPEG-2 Part 2, ITU-T H.263, ISO/IEC MPEG-4 Part 2, Advanced Video Coding (AVC), also known as ITU-T H.264 or ISO/IEC MPEG-4 Part 10, and High Efficiency Video Coding (HEVC), also known as ITU-T H.265 or MPEG-H Part 2. AVC includes extensions such as Scalable Video Coding (SVC), Multiview Video Coding (MVC) and Multiview Video Coding plus Depth (MVC+D), and 3D AVC (3D-AVC). HEVC includes extensions such as Scalable HEVC (SHVC), Multiview HEVC (MV-HEVC), and 3D HEVC (3D-HEVC).

There is also a new video coding standard, named Versatile Video Coding (VVC), being developed by the joint video experts team (WET) of ITU-T and ISO/IEC. While the VVC standard has several working drafts, one Working Draft (WD) of VVC in particular, namely B. Bross, J. Chen, and S. Liu, "Versatile Video Coding (Draft 5)," JVET-N1001-v3, 13th JVET Meeting, Mar. 27, 2019 (VVC Draft 5) is referenced herein. Each of the references in this paragraph and the preceding paragraph are incorporated by reference, in their entireties.

The description of the techniques disclosed herein are based on the under-development video coding standard Versatile Video Coding (VVC) by the joint video experts team (JVET) of ITU-T and ISO/IEC. However, the techniques also apply to other video codec specifications.

Figure 5:
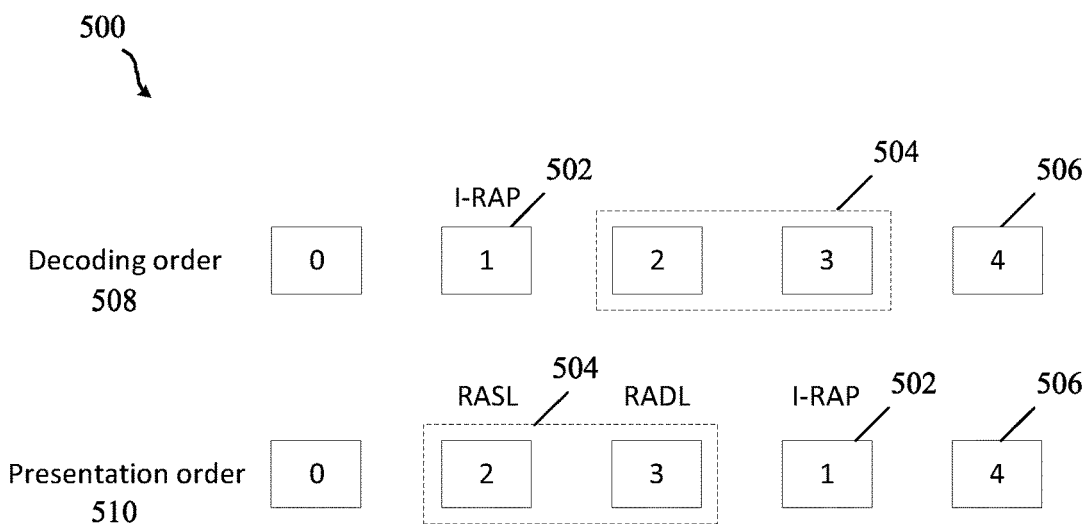
FIG. 5 is a coded video sequence depicting the relationship between an intra random access point (IRAP) picture relative to leading pictures and trailing pictures in a decoding order and a presentation order.

FIG. 5 is a representation 500 of a relationship between an intra random access point (IRAP) picture 502 relative to leading pictures 504 and trailing pictures 506 in a decoding order 508 and a presentation order 510. In an embodiment, the IRAP picture 502 is referred to as a clean random access (CRA) picture or as an instantaneous decoder refresh (IDR) picture with random access decodable (RADL) picture. In HEVC, IDR pictures, CRA pictures, and Broken Link Access (BLA) pictures are all considered IRAP pictures 502. For VVC, during the 12th JVET meeting in October 2018, it was agreed to have both IDR and CRA pictures as IRAP pictures. In an embodiment, Broken Link Access (BLA) and Gradual Decoder Refresh (GDR) pictures may also be considered to be IRAP pictures. The decoding process for a coded video sequence always starts at an IRAP.

As shown in FIG. 5, the leading pictures 504 (e.g., pictures 2 and 3) follow the IRAP picture 502 in the decoding order 508, but precede the IRAP picture 502 in the presentation order 510. The trailing picture 506 follows the IRAP picture 502 in both the decoding order 508 and in the presentation order 510. While two leading pictures 504 and one trailing picture 506 are depicted in FIG. 5, those skilled in the art will appreciate that more or fewer leading pictures 504 and/or trailing pictures 506 may be present in the decoding order 508 and the presentation order 510 in practical applications.

The leading pictures 504 in FIG. 5 have been divided into two types, namely random access skipped leading (RASL) and RADL. When decoding starts with the IRAP picture 502 (e.g., picture 1), the RADL picture (e.g., picture 3) can be properly decoded; however, the RASL picture (e.g., picture 2) cannot be properly decoded. Thus, the RASL picture is discarded. In light of the distinction between RADL and RASL pictures, the type of leading picture 504 associated with the IRAP picture 502 should be identified as either RADL or RASL for efficient and proper coding. In HEVC, when RASL and RADL pictures are present, it is constrained that for RASL and RADL pictures that are associated with the same TRAP picture 502, the RASL pictures shall precede the RADL pictures in presentation order 510.

An IRAP picture 502 provides the following two important functionalities/benefits. Firstly, the presence of an IRAP picture 502 indicates that the decoding process can start from that picture. This functionality allows a random access feature in which the decoding process starts at that position in the bitstream, not necessarily the beginning of the bitstream, as long as an TRAP picture 502 is present at that position. Secondly, the presence of an IRAP picture 502 refreshes the decoding process such that a coded picture starting at the IRAP picture 502, excluding RASL pictures, are coded without any reference to previous pictures. Having an IRAP picture 502 present in the bitstream consequently would stop any error that may happen during decoding of coded pictures prior to the TRAP picture 502 to propagate to the IRAP picture 502 and those pictures that follow the TRAP picture 502 in decoding order 508.

While IRAP pictures 502 provide important functionalities, they come with a penalty to the compression efficiency. The presence of an IRAP picture 502 causes a surge in bitrate. This penalty to the compression efficiency is due to two reasons. Firstly, as an IRAP picture 502 is an intra-predicted picture, the picture itself would require relatively more bits to represent when compared to other pictures (e.g., leading pictures 504, trailing pictures 506) that are inter-predicted pictures. Secondly, because the presence of an IRAP picture 502 breaks temporal prediction (this is because the decoder would refresh the decoding process, in which one of the actions of the decoding process for this is to remove previous reference pictures in the decoded picture buffer (DPB)), the IRAP picture 502 causes the coding of pictures that follow the IRAP picture 502 in decoding order 508 to be less efficient (i.e., needs more bits to represent) because they have less reference pictures for their interprediction coding.

Among the picture types that are considered IRAP pictures 502, the IDR picture in HEVC has different signaling and derivation when compared to other picture types. Some of the differences are as follows.

For signaling and derivation of a picture order count (POC) value of an IDR picture, the most significant bit (MSB) part of the POC is not derived from the previous key picture but simply set to be equal to 0.

For signaling information needed for reference picture management, the slice header of an IDR picture does not contain information needed to be signaled to assist reference picture management. For other picture types (i.e., CRA, Trailing, temporal sub-layer access (TSA), etc.), information such as the reference picture set (RPS) described below or other forms of similar information (e.g., reference picture lists) are needed for the reference pictures marking process (i.e., the process to determine the status of reference pictures in the decoded picture buffer (DPB), either used for reference or unused for reference). However, for the IDR picture, such information does not need to be signaled because the presence of IDR indicates that the decoding process shall simply mark all reference pictures in the DPB as unused for reference.

In addition to IRAP pictures concept, there is also leading pictures that, if present, are associated with an IRAP picture. Leading pictures are pictures that follow its associated IRAP picture in decoding order but precede the IRAP picture in output order. Depending on the coding configuration and picture referencing structure, leading pictures are further identified into two types. The first type is the leading pictures that may not be decoded correctly if decoding process starts at its associated IRAP picture. This may happen because these leading pictures are coded with reference to pictures that precede the IRAP picture in decoding order. Such leading pictures are called random access skipped leading (RASL). The second type is the leading pictures that shall be decoded correctly even if decoding process starts at its associated IRAP picture. This is possible because these leading pictures are coded without referencing directly or indirectly to pictures that precede the IRAP picture in decoding order. Such leading pictures are called random access decodable leading (RADL). In HEVC, when RASL and RADL pictures are present, it is constrained that for RASL and RADL pictures that are associated with the same IRAP picture, the RASL pictures shall precede the RADL pictures in output order.

In HEVC and VVC, IRAP pictures 502 and leading pictures 504 may each be contained within a single network abstraction layer (NAL) unit. A set of the NAL units may be referred to as an access unit. IRAP pictures 502 and leading pictures 504 are given different NAL unit types so that they can be easily identified by system level applications. For example, a video splicer needs to understand coded picture types without having to understand too much detail of the syntax element in the coded bitstream, particularly to identify IRAP pictures 502 from non-IRAP pictures and to identify leading pictures 504, including determining RASL and RADL pictures, from trailing pictures 506. Trailing pictures 506 are those pictures that are associated with an IRAP picture 502 and follow the IRAP picture 502 in presentation order 510. A picture may follow the particular IRAP picture 502 in decoding order 508 and precede any other IRAP picture 502 in decoding order 508. For this, giving IRAP pictures 502 and leading pictures 504 their own NAL unit type helps such applications.

For HEVC, NAL unit types for IRAP pictures include the following:
  BLA with leading picture (BLA_W_LP): NAL unit of a Broken Link Access (BLA) picture that may be followed by one or more leading pictures in decoding order.
  BLA with RADL (BLA_W_RADL): NAL unit of a BLA picture that may be followed by one or more RADL pictures but no RASL picture in decoding order.
  BLA with no leading picture (BLA_N_LP): NAL unit of a BLA picture that is not followed by leading picture in decoding order.
  IDR with RADL (IDR_W_RADL): NAL unit of an IDR picture that may be followed by one or more RADL pictures but no RASL picture in decoding order.
  IDR with no leading picture (IDR_N_LP): NAL unit of an IDR picture that is not followed by leading picture in decoding order.
  CRA: NAL unit of a Clean Random Access (CRA) picture that may be followed by leading pictures (i.e., either RASL pictures or RADL pictures or both).
  RADL: NAL unit of a RADL picture.
  RASL: NAL unit of a RASL picture.

For VVC, the NAL unit type for IRAP pictures 502 and leading pictures 504 are as follows:
  IDR with RADL (IDR_W_RADL): NAL unit of an IDR picture that may be followed by one or more RADL pictures but no RASL picture in decoding order.
  IDR with no leading picture (IDR_N_LP): NAL unit of an IDR picture that is not followed by leading picture in decoding order.
  CRA: NAL unit of a Clean Random Access (CRA) picture that may be followed by leading pictures (i.e., either RASL pictures or RADL pictures or both).
  RADL: NAL unit of a RADL picture.
  RASL: NAL unit of a RASL picture.

The reference picture resampling (RPR) feature is the ability to change the spatial resolution of coded pictures in the middle of a bitstream without the need of intra-coding of the picture at the resolution-changing location. To enable this, a picture needs to be able refer to, for inter prediction purpose, one or more reference pictures for which the spatial resolution is different from that of the current picture. Consequently, resampling of such a reference picture, or part thereof, is needed for encoding and decoding of the current picture. Thus, the name RPR. This feature may also be referred to as adaptive resolution change (ARC) or other names. There are use cases or application scenarios that would benefit from the RPR feature, including the following.

Rate adaption in video telephony and conferencing. This is for adapting the coded video to the changing network conditions. When network conditions get worse so that available bandwidth becomes lower, the encoder may adapt to it by encoding smaller resolution pictures.

Active speaker change in multi-party video conferencing. For multi-party video conferencing, it is common that the video size for the active speaker is bigger or larger than the video size for the rest of conference participants. When the active speaker changes, the picture resolution for each participant may also need to be adjusted. The need to have ARC features becomes more important when a change in the active speaker happens frequently.

Fast start in streaming. For a streaming application, it is common that the application will buffer up to a certain length of decoded picture before starting to display pictures. Starting the bitstream with a smaller resolution would allow the application to have enough pictures in the buffer to start displaying faster.

Adaptive stream switching in streaming. The Dynamic Adaptive Streaming over HTTP (DASH) specification includes a feature named @mediaStreamStructureId. This feature enables switching between different representations at open-group of picture (GOP) random access points with non-decodable leading pictures, e.g., CRA pictures with associated RASL pictures in HEVC. When two different representations of the same video have different bitrates but the same spatial resolution while they have the same value of @mediaStreamStructureId, switching between the two representations at a CRA picture with associated RASL pictures can be performed, and the RASL pictures associated with the switching-at CRA pictures can be decoded with acceptable quality hence enabling seamless switching. With ARC, the @mediaStreamStructureId feature would also be usable for switching between DASH representations with different spatial resolutions.

Various methods facilitate basic techniques for supporting RPR/ARC such as signaling of lists of picture resolutions, some constraints of resampling of reference pictures in the DPB, etc.

One component of the technique needed to support RPR is a method to signal picture resolutions that may be present in the bitstream. This is addressed in some examples by changing the current signaling of a picture resolution with a list of picture resolutions in the SPS as shown below.

|  | Descriptor |
|---|---|
| seq_parameter_set_rbsp( ) { | |
| ... | |
| num_pic_size_in_luma_samples_minus1 | ue(v) |
| for( i = 0; | |
| i <= num_pic_size_in_luma_samples_minus1; i++ ) { | |
| pic_width_in_luma_samples[ i ] | ue(v) |
| pic_height_in_luma_samples[ i ] | ue(v) |
| } | |
| ... | |
| } | | num_pic_size_in_luma_samples_minus1 plus 1 specifies the number of picture sizes (width and height) in units of luma samples that may be present in the coded video sequence.

pic_width_in_luma_samples[i] specifies the i-th width of decoded pictures in units of luma samples that may be present in the coded video sequence. pic_width_in_luma_samples[i] shall not be equal to 0 and shall be an integer multiple of MinCbSizeY.

pic_height_in_luma_samples[i] specifies the i-th height of decoded pictures in units of luma samples that may be present in the coded video sequence. pic_height_in_luma_samples[i] shall not be equal to 0 and shall be an integer multiple of MinCbSizeY.

During the 15th JVET meeting, another variant of signaling picture size and conformance windows for supporting RPR was discussed. The signaling is as follows.

Signal the maximum picture size (i.e., picture width and picture height) in SPS

Signal picture size in picture parameter set (PPS)

Move the current signaling of conformance windows from SPS to PPS. Conformance window information is used to crop the reconstructed/decoded pictures in the process for preparing the picture for output. The cropped picture size is the picture size after the picture has been cropped by using its associated conformance window.

The signaling of picture size and conformance windows is as follows.

|  | Descriptor |
|---|---|
| seq_parameter_set_rbsp( ) { | |
| ... | |
| ~~pic_width_in_luma_samples~~ | ~~ue(v)~~ |
| ~~pic_height_in_luma_samples~~ | ~~ue(v)~~ |
| max_width_in_luma_samples | ue(v) |
| max_height_in_luma_samples | ue(v) |
| ... | |
| } | | max_width_in_luma_samples specifies that it is a requirement of bitstream conformance that pic_width_in_luma_samples for any picture for which this SPS is active is less than or equal to max_width_in_luma_samples.

max_height_in_luma_samples specifies that it is a requirement of bitstream conformance that pic_height_in_luma_samples for any picture for which this SPS is active is less than or equal to max_height_in_luma_samples.

|  | Descriptor |
|---|---|
| pic_parameter_set_rbsp( ) { | |
| ... | |
| pps_seq_parameter_set_id | ue(v) |
| pic_width_in_luma_samples | ue(v) |
| pic_height_in_luma_samples | ue(v) |
| conformance_window_flag | u(1) |
| if( conformance_window_flag ) { | |
| conf_win_left_offset | ue(v) |
| conf_win_right_offset | ue(v) |
| conf_win_top_offset | ue(v) |
| conf_win_bottom_offset | ue(v) |
| } | |
| ... | |
| } | | pic_width_in_luma_samples specifies the width of each decoded picture referencing the PPS in units of luma samples. pic_width_in_luma_samples shall not be equal to 0 and shall be an integer multiple of MinCbSizeY.

pic_height_in_luma_samples specifies the height of each decoded picture referencing the PPS in units of luma samples. pic_height_in_luma_samples shall not be equal to 0 and shall be an integer multiple of MinCbSizeY.

It is a requirement of bitstream conformance that all of the following conditions are satisfied for every active reference picture whose width and height are reference_pic_width_in_luma_samples and reference_pic_height_in_luma_samples:

2*pic_width_in_luma_samples>=reference_pic_width_in_luma_samples

2*pic_height_in_luma_samples>=reference_pic_height_in_luma_samples pic_width_in_luma_samples<=8*reference_pic_width_in_luma_samples pic_height_in_luma_samples<=8*reference_pic_height_in_luma_samples The variables PicWidthInCtbsY, PicHeightInCtbsY, PicSizeInCtbsY, PicWidthInMinCbsY, PicHeightInMinCbsY, PicSizeInMinCbsY, PicSizeInSamplesY, PicWidthInSamplesC and PicHeightInSamplesC are derived as follows:

$$\text{PicWidthInCtbs}Y = \text{Ceil}(\text{pic\_width\_in\_luma\_samples} \div \text{CtbSize}Y) \quad (1)$$

$$\text{PicHeightInCtbs}Y = \text{Ceil}(\text{pic\_height\_in\_luma\_samples} \div \text{CtbSize}Y) \quad (2)$$

$$\text{PicSizeInCtbs}Y = \text{PicWidthInCtbs}Y \ast \text{PicHeightInCtbs}Y \quad (3)$$

$$\text{PicWidthInMinCbs}Y = \text{pic\_width\_in\_luma\_samples}/\text{MinCbSize}Y \quad (4)$$

$$\text{PicHeightInMinCbs}Y = \text{pic\_height\_in\_luma\_samples}/\text{MinCbSize}Y \quad (5)$$

$$\text{PicSizeInMinCbs}Y = \text{PicWidthInMinCbs}Y \ast \text{PicHeightInMinCbs}Y \quad (6)$$

$$\text{PicSizeInSamples}Y = \text{pic\_width\_in\_luma\_samples} \ast \text{pic\_height\_in\_luma\_samples} \quad (7)$$

$$\text{PicWidthInSamples}C = \text{pic\_width\_in\_luma\_samples}/\text{SubWidth}C \quad (8)$$

$$\text{PicHeightInSamples}C = \text{pic\_height\_in\_luma\_samples}/\text{SubHeight}C \quad (9)$$

conformance_window_flag equal to 1 indicates that the conformance cropping window offset parameters follow next in the PPS. conformance_window_flag equal to 0 indicates that the conformance cropping window offset parameters are not present.

conf_win_left_offset, conf_win_right_offset, conf_win_top_offset, and conf_win_bottom_offset specify the samples of the pictures referencing the PPS that are output from the decoding process, in terms of a rectangular region specified in picture coordinates for output. When conformance_window_flag is equal to 0, the values of conf_win_left_offset, conf_win_right_offset, conf_win_top_offset, and conf_win_bottom_offset are inferred to be equal to 0.

The conformance cropping window contains the luma samples with horizontal picture coordinates from SubWidthC*conf_win_left_offset to pic_width_in_luma_samples−(SubWidthC*conf_win_right_offset+1) and vertical picture coordinates from SubHeightC*conf_win_top_offset to pic_height_in_luma_samples−(SubHeightC*conf_win_bottom_offset+1), inclusive.

The value of SubWidthC*(conf_win_left_offset+conf_win_right_offset) shall be less than pic_width_in_luma_samples, and the value of SubHeightC*(conf_win_top_offset+conf_win_bottom_offset) shall be less than pic_height_in_luma_samples.

The variables PicOutputWidthL and PicOutputHeightL are derived as follows:

$$\text{PicOutputWidth}L = \text{pic\_width\_in\_luma\_samples} - \text{SubWidth}C \ast (\text{conf\_win\_right\_offset} + \text{conf\_win\_left\_offset}) \quad (10)$$

$$\text{PicOutputHeight}L = \text{pic\_height\_in\_pic\_size\_units} - \text{SubHeight}C \ast (\text{conf\_win\_bottom\_offset} + \text{conf\_win\_top\_offset}) \quad (11)$$

When ChromaArrayType is not equal to 0, the corresponding specified samples of the two chroma arrays are the samples having picture coordinates (x/SubWidthC, y/SubHeightC), where (x, y) are the picture coordinates of the specified luma samples.

NOTE—The conformance cropping window offset parameters are only applied at the output. All internal decoding processes are applied to the uncropped picture size.

The signaling of picture size and conformance window in PPS introduces the following problems.

Because multiple PPSs may be present in a coded video sequence (CVS), it is possible that two PPSs may contain the same picture size signaling but different conformance windows signaling. This will result in the situation where two pictures, referring to a different PPS, have the same picture size but different cropping size.

For supporting RPR, several coding tools have been suggested to be turned off for coding of a block when the current picture and the reference picture of the block have different picture sizes. However, since it is now possible that cropping size may also be different even when the two pictures have same picture size, it is necessary to have an additional check based on cropping size.

Disclosed herein are techniques that constrain picture parameter sets that have the same picture size to also have the same conformance window size (e.g., cropping window size). By keeping the conformance window the same size for picture parameter sets having the same picture size, overly complex processing may be avoided when reference picture resampling (RPR) is enabled. Thus, usage of the processor, memory, and/or network resources may be reduced at both the encoder and the decoder. Thus, the coder/decoder (a.k.a., "codec") in video coding is improved relative to current codecs. As a practical matter, the improved video coding process offers the user a better user experience when videos are sent, received, and/or viewed.

Scalability in video coding usually is supported by using multi-layer coding techniques. A multi-layer bitstream comprises a base layer (BL) and one or more enhancement layers (ELs). An example of scalabilities include spatial scalability, quality/signal-to-noise (SNR) scalability, multi-view scalability, etc. When a multi-layer coding technique is used, a picture or a part thereof may be coded (1) without using a reference picture, i.e., using intra prediction; (2) by referencing to reference pictures that are in the same layer, i.e., using inter prediction; or (3) by referencing to reference pictures that are in other layer(s), i.e., using inter-layer prediction. A reference picture used for inter-layer prediction of the current picture is referred to as an inter-layer reference picture (ILRP).

Figure 6:
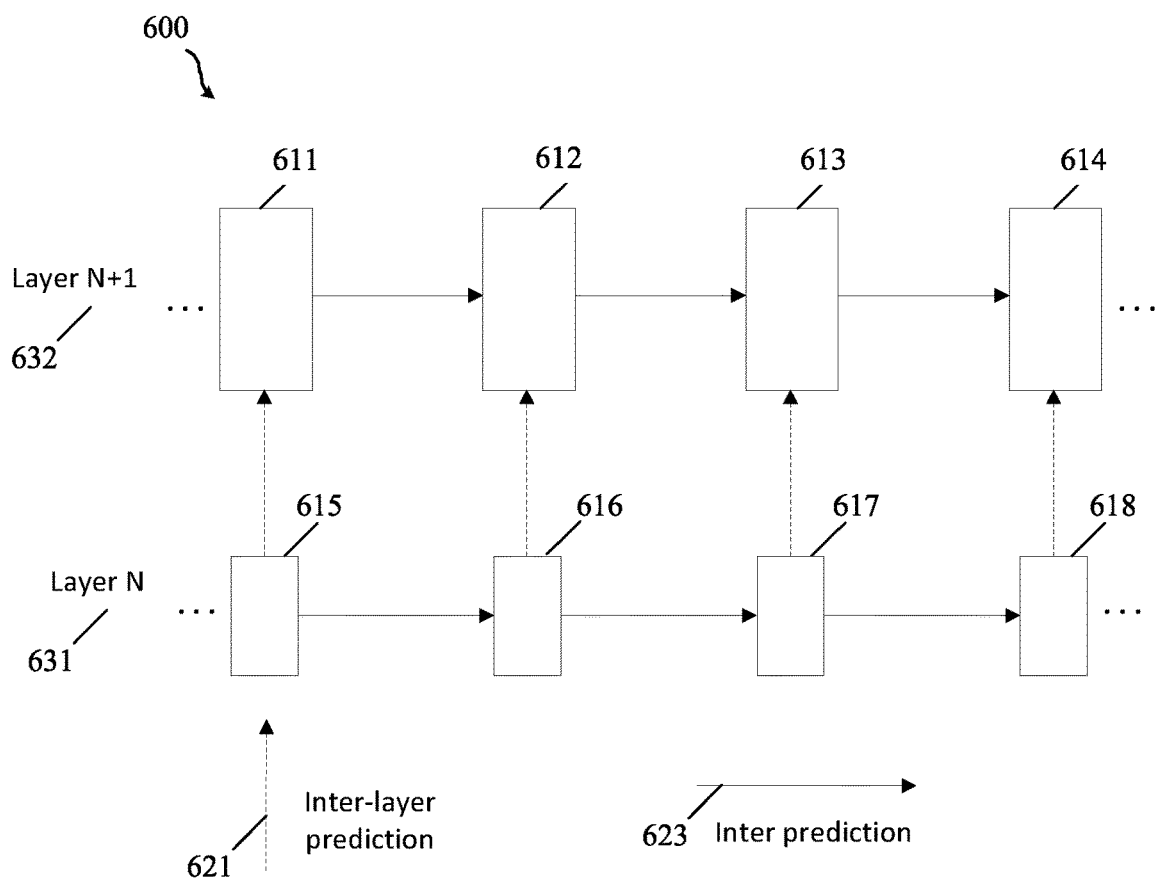
FIG. 6 illustrates an example of multi-layer coding for spatial scalability.

FIG. 6 is a schematic diagram illustrating an example of layer based prediction 600, for example as performed to determine MVs at block compression step 105, block decoding step 113, motion estimation component 221, motion compensation component 219, motion compensation component 321, and/or motion compensation component 421. Layer based prediction 600 is compatible with unidirectional inter-prediction and/or bidirectional inter-prediction, but is also performed between pictures in different layers.

Layer based prediction 600 is applied between pictures 611, 612, 613, and 614 and pictures 615, 616, 617, and 618 in different layers. In the example shown, pictures 611, 612, 613, and 614 are part of layer N+1 632 and pictures 615, 616, 617, and 618 are part of layer N 631. A layer, such as layer N 631 and/or layer N+1 632, is a group of pictures that are all associated with a similar value of a characteristic, such as a similar size, quality, resolution, signal to noise ratio, capability, etc. In the example shown, layer N+1 632 is associated with a larger image size than layer N 631.

Accordingly, pictures 611, 612, 613, and 614 in layer N+1 632 have a larger picture size (e.g., larger height and width and hence more samples) than pictures 615, 616, 617, and 618 in layer N 631 in this example. However, such pictures can be separated between layer N+1 632 and layer N 631 by other characteristics. While only two layers, layer N+1 632 and layer N 631, are shown, a set of pictures can be separated into any number of layers based on associated characteristics. Layer N+1 632 and layer N 631 may also be denoted by a layer ID. A layer ID is an item of data that is associated with a picture and denotes the picture is part of an indicated layer. Accordingly, each picture 611-618 may be associated with a corresponding layer ID to indicate which layer N+1 632 or layer N 631 includes the corresponding picture.

Pictures 611-618 in different layers 631-632 are configured to be displayed in the alternative. As such, pictures 611-618 in different layers 631-632 can share the same temporal identifier (ID) and can be included in the same AU. As used herein, an AU is a set of one or more coded pictures associated with the same display time for output from a DPB. For example, a decoder may decode and display picture 615 at a current display time if a smaller picture is desired or the decoder may decode and display picture 611 at the current display time if a larger picture is desired. As such, pictures 611-614 at higher layer N+1 632 contain substantially the same image data as corresponding pictures 615-618 at lower layer N 631 (notwithstanding the difference in picture size). Specifically, picture 611 contains substantially the same image data as picture 615, picture 612 contains substantially the same image data as picture 616, etc.

Pictures 611-618 can be coded by reference to other pictures 611-618 in the same layer N 631 or N+1 632. Coding a picture in reference to another picture in the same layer results in inter-prediction 623, which is compatible unidirectional inter-prediction and/or bidirectional inter-prediction. Inter-prediction 623 is depicted by solid line arrows. For example, picture 613 may be coded by employing inter-prediction 623 using one or two of pictures 611, 612, and/or 614 in layer N+1 632 as a reference, where one picture is referenced for unidirectional inter-prediction and/or two pictures are reference for bidirectional inter-prediction. Further, picture 617 may be coded by employing inter-prediction 623 using one or two of pictures 615, 616, and/or 618 in layer N 631 as a reference, where one picture is referenced for unidirectional inter-prediction and/or two pictures are reference for bidirectional inter-prediction. When a picture is used as a reference for another picture in the same layer when performing inter-prediction 623, the picture may be referred to as a reference picture. For example, picture 612 may be a reference picture used to code picture 613 according to inter-prediction 623. Inter-prediction 623 can also be referred to as intra-layer prediction in a multi-layer context. As such, inter-prediction 623 is a mechanism of coding samples of a current picture by reference to indicated samples in a reference picture that is different from the current picture where the reference picture and the current picture are in the same layer.

Pictures 611-618 can also be coded by reference to other pictures 611-618 in different layers. This process is known as inter-layer prediction 621, and is depicted by dashed arrows. Inter-layer prediction 621 is a mechanism of coding samples of a current picture by reference to indicated samples in a reference picture where the current picture and the reference picture are in different layers and hence have different layer IDs. For example, a picture in a lower layer N 631 can be used as a reference picture to code a corresponding picture at a higher layer N+1 632. As a specific example, picture 611 can be coded by reference to picture 615 according to inter-layer prediction 621. In such a case, the picture 615 is used as an inter-layer reference picture. An inter-layer reference picture is a reference picture used for inter-layer prediction 621. In most cases, inter-layer prediction 621 is constrained such that a current picture, such as picture 611, can only use inter-layer reference picture(s) that are included in the same AU and that are at a lower layer, such as picture 615. When multiple layers (e.g., more than two) are available, inter-layer prediction 621 can encode/decode a current picture based on multiple inter-layer reference picture(s) at lower levels than the current picture.

A video encoder can employ layer based prediction 600 to encode pictures 611-618 via many different combinations and/or permutations of inter-prediction 623 and inter-layer prediction 621. For example, picture 615 may be coded according to intra-prediction. Pictures 616-618 can then be coded according to inter-prediction 623 by using picture 615 as a reference picture. Further, picture 611 may be coded according to inter-layer prediction 621 by using picture 615 as an inter-layer reference picture. Pictures 612-614 can then be coded according to inter-prediction 623 by using picture 611 as a reference picture. As such, a reference picture can serve as both a single layer reference picture and an inter-layer reference picture for different coding mechanisms. By coding higher layer N+1 632 pictures based on lower layer N 631 pictures, the higher layer N+1 632 can avoid employing intra-prediction, which has much lower coding efficiency than inter-prediction 623 and inter-layer prediction 621. As such, the poor coding efficiency of intra-prediction can be limited to the smallest/lowest quality pictures, and hence limited to coding the smallest amount of video data. The pictures used as reference pictures and/or inter-layer reference pictures can be indicated in entries of reference picture list(s) contained in a reference picture list structure.

Previous H.26x video coding families have provided support for scalability in separate profile(s) from the profile(s) for single-layer coding. Scalable video coding (SVC) is the scalable extension of the AVC/H.264 that provides support for spatial, temporal, and quality scalabilities. For SVC, a flag is signaled in each macroblock (MB) in EL pictures to indicate whether the EL MB is predicted using the collocated block from a lower layer. The prediction from the collocated block may include texture, motion vectors, and/or coding modes. Implementations of SVC cannot directly reuse unmodified H.264/AVC implementations in their design. The SVC EL macroblock syntax and decoding process differs from H.264/AVC syntax and decoding process.

Scalable HEVC (SHVC) is the extension of the HEVC/H.265 standard that provides support for spatial and quality scalabilities, multiview HEVC (MV-HEVC) is the extension of the HEVC/H.265 that provides support for multi-view scalability, and 3D HEVC (3D-HEVC) is the extension of the HEVC/H.264 that provides supports for three dimensional (3D) video coding that is more advanced and more efficient than MV-HEVC. Note that the temporal scalability is included as an integral part of the single-layer HEVC codec. The design of the multi-layer extension of HEVC employs the idea where the decoded pictures used for inter-layer prediction come only from the same access unit (AU) and are treated as long-term reference pictures (LTRPs), and are assigned reference indices in the reference picture list(s) along with other temporal reference pictures in the current layer. Inter-layer prediction (ILP) is achieved at the prediction unit (PU) level by setting the value of the reference index to refer to the inter-layer reference picture(s) in the reference picture list(s).

Notably, both reference picture resampling and spatial scalability features call for resampling of a reference picture or part thereof. Reference picture resampling can be realized at either the picture level or coding block level. However, when RPR is referred to as a coding feature, it is a feature for single-layer coding. Even so, it is possible or even preferable from a codec design point of view to use the same resampling filter for both the RPR feature of single-layer coding and the spatial scalability feature for multi-layer coding.

Figure 7:
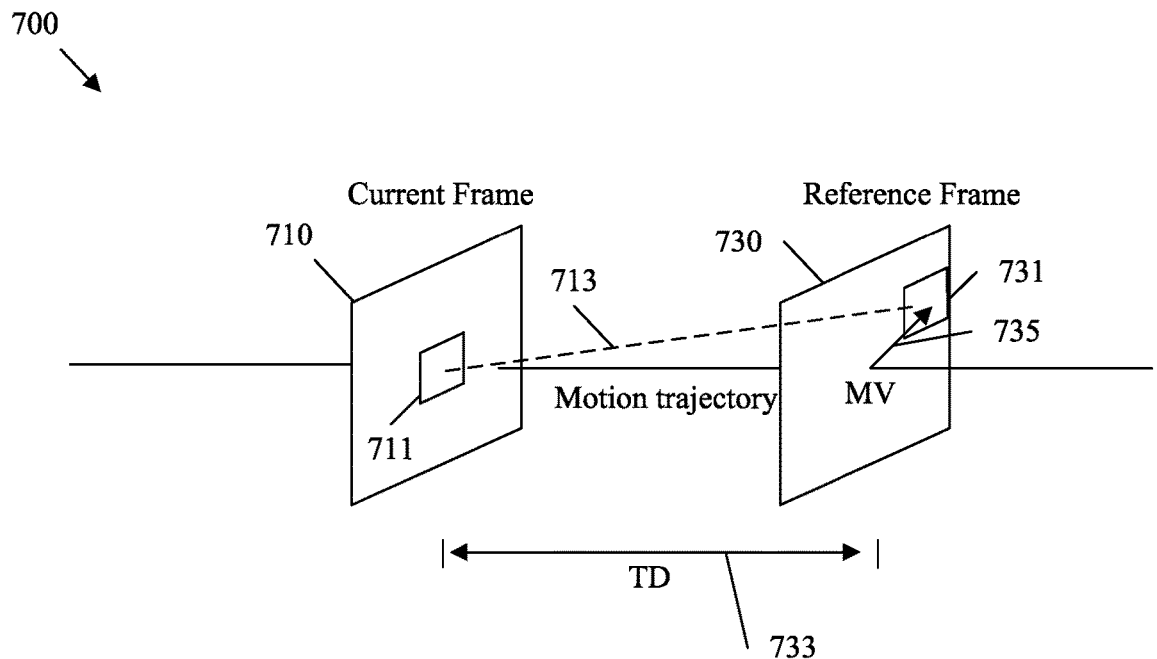
FIG. 7 is a schematic diagram illustrating an example of unidirectional inter prediction.

FIG. 7 is a schematic diagram illustrating an example of unidirectional inter prediction 700. Unidirectional inter prediction 700 can be employed to determine motion vectors for encoded and/or decoded blocks created when partitioning a picture.

Unidirectional inter prediction 700 employs a reference frame 730 with a reference block 731 to predict a current block 711 in a current frame 710. The reference frame 730 may be temporally positioned after the current frame 710 as shown (e.g., as a subsequent reference frame), but may also be temporally positioned before the current frame 710 (e.g., as a preceding reference frame) in some examples. The current frame 710 is an example frame/picture being encoded/decoded at a particular time. The current frame 710 contains an object in the current block 711 that matches an object in the reference block 731 of the reference frame 730. The reference frame 730 is a frame that is employed as a reference for encoding a current frame 710, and a reference block 731 is a block in the reference frame 730 that contains an object also contained in the current block 711 of the current frame 710.

The current block 711 is any coding unit that is being encoded/decoded at a specified point in the coding process. The current block 711 may be an entire partitioned block, or may be a sub-block when employing affine inter prediction mode. The current frame 710 is separated from the reference frame 730 by some temporal distance (TD) 733. The TD 733 indicates an amount of time between the current frame 710 and the reference frame 730 in a video sequence, and may be measured in units of frames. The prediction information for the current block 711 may reference the reference frame 730 and/or reference block 731 by a reference index indicating the direction and temporal distance between the frames. Over the time period represented by the TD 733, the object in the current block 711 moves from a position in the current frame 710 to another position in the reference frame 730 (e.g., the position of the reference block 731). For example, the object may move along a motion trajectory 713, which is a direction of movement of an object over time. A motion vector 735 describes the direction and magnitude of the movement of the object along the motion trajectory 713 over the TD 733. Accordingly, an encoded motion vector 735, a reference block 731, and a residual including the difference between the current block 711 and the reference block 731 provides information sufficient to reconstruct a current block 711 and position the current block 711 in the current frame 710.

Figure 8:
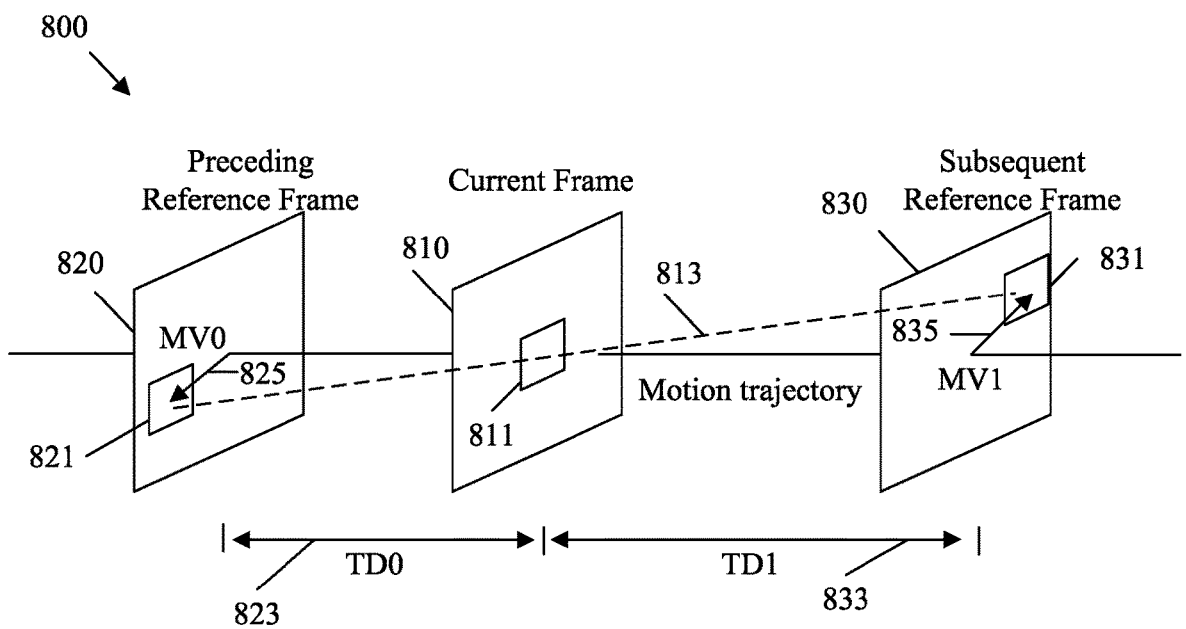
FIG. 8 is a schematic diagram illustrating an example of bidirectional inter prediction.

FIG. 8 is a schematic diagram illustrating an example of bidirectional inter prediction 800. Bidirectional inter prediction 800 can be employed to determine motion vectors for encoded and/or decoded blocks created when partitioning a picture.

Bidirectional inter prediction 800 is similar to unidirectional inter prediction 700, but employs a pair of reference frames to predict a current block 811 in a current frame 810. Hence current frame 810 and current block 811 are substantially similar to current frame 710 and current block 711, respectively. The current frame 810 is temporally positioned between a preceding reference frame 820, which occurs before the current frame 810 in the video sequence, and a subsequent reference frame 830, which occurs after the current frame 810 in the video sequence. Preceding reference frame 820 and subsequent reference frame 830 are otherwise substantially similar to reference frame 730.

The current block 811 is matched to a preceding reference block 821 in the preceding reference frame 820 and to a subsequent reference block 831 in the subsequent reference frame 830. Such a match indicates that, over the course of the video sequence, an object moves from a position at the preceding reference block 821 to a position at the subsequent reference block 831 along a motion trajectory 813 and via the current block 811. The current frame 810 is separated from the preceding reference frame 820 by some preceding temporal distance (TD0) 823 and separated from the subsequent reference frame 830 by some subsequent temporal distance (TD1) 833. The TD0 823 indicates an amount of time between the preceding reference frame 820 and the current frame 810 in the video sequence in units of frames. The TD1 833 indicates an amount of time between the current frame 810 and the subsequent reference frame 830 in the video sequence in units of frame. Hence, the object moves from the preceding reference block 821 to the current block 811 along the motion trajectory 813 over a time period indicated by TD0 823. The object also moves from the current block 811 to the subsequent reference block 831 along the motion trajectory 813 over a time period indicated by TD1 833. The prediction information for the current block 811 may reference the preceding reference frame 820 and/or preceding reference block 821 and the subsequent reference frame 830 and/or subsequent reference block 831 by a pair of reference indices indicating the direction and temporal distance between the frames.

A preceding motion vector (MV0) 825 describes the direction and magnitude of the movement of the object along the motion trajectory 813 over the TD0 823 (e.g., between the preceding reference frame 820 and the current frame 810). A subsequent motion vector (MV1) 835 describes the direction and magnitude of the movement of the object along the motion trajectory 813 over the TD1 833 (e.g., between the current frame 810 and the subsequent reference frame 830). As such, in bidirectional inter prediction 800, the current block 811 can be coded and reconstructed by employing the preceding reference block 821 and/or the subsequent reference block 831, MV0 825, and MV1 835.

In an embodiment, inter prediction and/or bidirectional inter prediction may be carried out on a sample-by-sample (e.g., pixel-by-pixel) basis instead of on a block-by-block basis. That is, a motion vector pointing to each sample in the preceding reference block 821 and/or the subsequent reference block 831 can be determined for each sample in the current block 811. In such embodiments, the motion vector 825 and the motion vector 835 depicted in FIG. 8 represent a plurality of motion vectors corresponding to the plurality of samples in the current block 811, the preceding reference block 821, and the subsequent reference block 831.

In both merge mode and advanced motion vector prediction (AMVP) mode, a candidate list is generated by adding candidate motion vectors to a candidate list in an order defined by a candidate list determination pattern. Such candidate motion vectors may include motion vectors according to unidirectional inter prediction 700, bidirectional inter prediction 800, or combinations thereof. Specifically, motion vectors are generated for neighboring blocks when such blocks are encoded. Such motion vectors are added to a candidate list for the current block, and the motion vector for the current block is selected from the candidate list. The motion vector can then be signaled as the index of the selected motion vector in the candidate list. The decoder can construct the candidate list using the same process as the encoder, and can determine the selected motion vector from the candidate list based on the signaled index. Hence, the candidate motion vectors include motion vectors generated according to unidirectional inter prediction 700 and/or bidirectional inter prediction 800, depending on which approach is used when such neighboring blocks are encoded.

Figure 9:
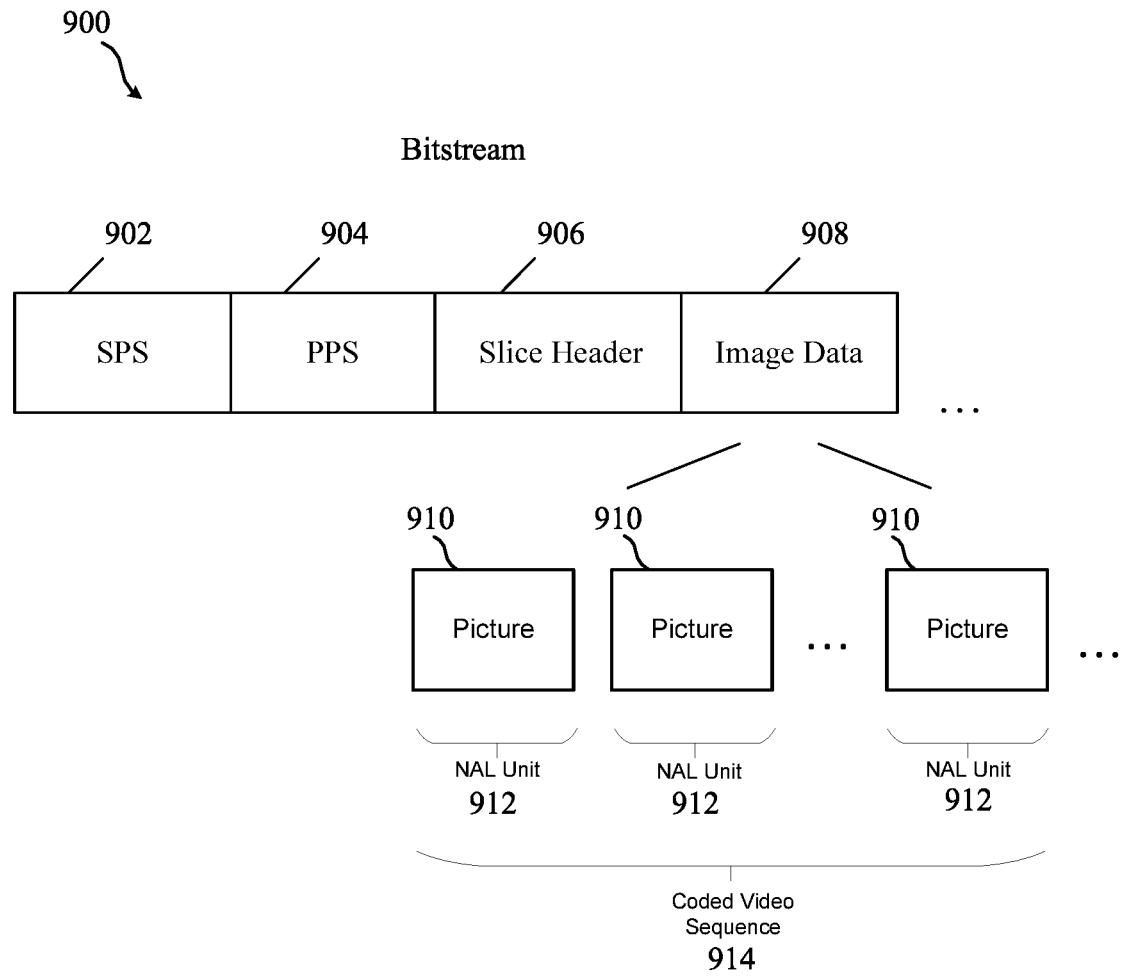
FIG. 9 illustrates a video bitstream.

FIG. 9 illustrates a video bitstream 900. As used herein the video bitstream 900 may also be referred to as a coded video bitstream, a bitstream, or variations thereof. As shown in FIG. 9, the bitstream 900 comprises a sequence parameter set (SPS) 902, a picture parameter set (PPS) 904, a slice header 906, and image data 908.

The SPS 902 contains data that is common to all the pictures in a sequence of pictures (SOP). In contrast, the PPS 904 contains data that is common to the entire picture. The slice header 906 contains information about the current slice such as, for example, the slice type, which of the reference pictures will be used, and so on. The SPS 902 and the PPS 904 may be generically referred to as a parameter set. The SPS 902, the PPS 904, and the slice header 906 are types of Network Abstraction Layer (NAL) units. A NAL unit is a syntax structure containing an indication of the type of data to follow (e.g., coded video data). NAL units are classified into video coding layer (VCL) and non-VCL NAL units. The VCL NAL units contain the data that represents the values of the samples in the video pictures, and the non-VCL NAL units contain any associated additional information such as parameter sets (important header data that can apply to a large number of VCL NAL units) and supplemental enhancement information (timing information and other supplemental data that may enhance usability of the decoded video signal but are not necessary for decoding the values of the samples in the video pictures). Those skilled in the art will appreciate that the bitstream 900 may contain other parameters and information in practical applications.

The image data 908 of FIG. 9 comprises data associated with the images or video being encoded or decoded. The image data 908 may be simply referred to as the payload or data being carried in the bitstream 900. In an embodiment, the image data 908 comprises the CVS 914 (or CLVS) containing a plurality of pictures 910. The CVS 914 is a coded video sequence for every coded layer video sequence (CLVS) in the video bitstream 900. Notably, the CVS and the CLVS are the same when the video bitstream 900 includes a single layer. The CVS and the CLVS are only different when the video bitstream 900 includes multiple layers.

As shown in FIG. 9, a slice of each picture 910 may be contained within its own VCL NAL unit 912. The set of VCL NAL units 912 in the CVS 914 may be referred to as an access unit.

Figure 10:
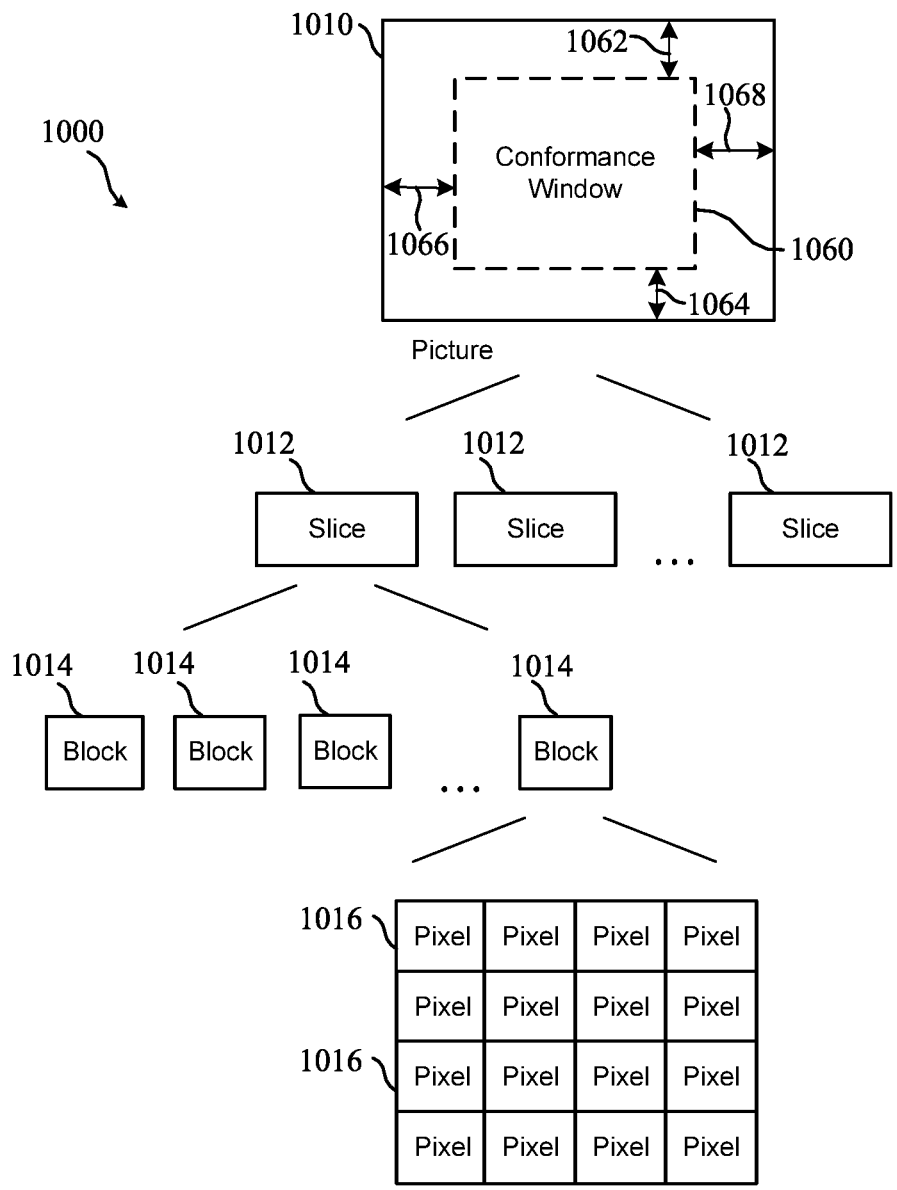
FIG. 10 illustrates a partitioning technique for a picture.

FIG. 10 illustrates a partitioning technique 1000 for a picture 1010. The picture 1010 may be similar to any of the pictures 910 in FIG. 9. As shown, the picture 1010 may be partitioned into a plurality of slices 1012. A slice is a spatially distinct region of a frame (e.g., a picture) that is encoded separately from any other region in the same frame. While three slices 1012 are depicted in FIG. 10, more or fewer slices may be used in practical applications. Each slice 1012 may be partitioned into a plurality of blocks 1014. The blocks 1014 in FIG. 10 may be similar to the current block 811, the preceding reference block 821, and the subsequent reference block 831 in FIG. 8. The block 1014 may represent a CU. While four blocks 1014 are depicted in FIG. 10, more or fewer blocks may be used in practical applications.

Each block 1014 may be partitioned into a plurality of samples 1016 (e.g., pixels). In an embodiment, the size of each block 1014 is measured in luma samples. While sixteen samples 1016 are depicted in FIG. 10, more or fewer samples may be used in practical applications.

In an embodiment, a conformance window 1060 is applied to the picture 1010. As noted above, the conformance window 1060 is used to crop, reduce, or otherwise change the size of the picture 1010 (e.g., a reconstructed/decoded picture) in the process for preparing the picture for output. For example, a decoder can apply the conformance window 1060 to the picture 1010 in order to crop, trim, shrink, or otherwise change the size of the picture 1010 picture prior to the picture being output for display to a user. The size of the conformance window 1060 is determined by applying a conformance window top offset 1062, a conformance window bottom offset 1064, a conformance window left offset 1066, and a conformance window right offset 1068 to the picture 1010 to reduce the size of the picture 1010 prior to output. That is, only the portion of the picture 1010 that exists within the conformance window 1060 is output. Thus, the picture 1010 is cropped in size before being output. In an embodiment, a first picture parameter set and a second picture parameter set each refer to the same sequence parameter set and have the same values of picture width and picture height. As such, the first picture parameter set and the second picture parameter set have the same values for a conformance window.

Figure 11:
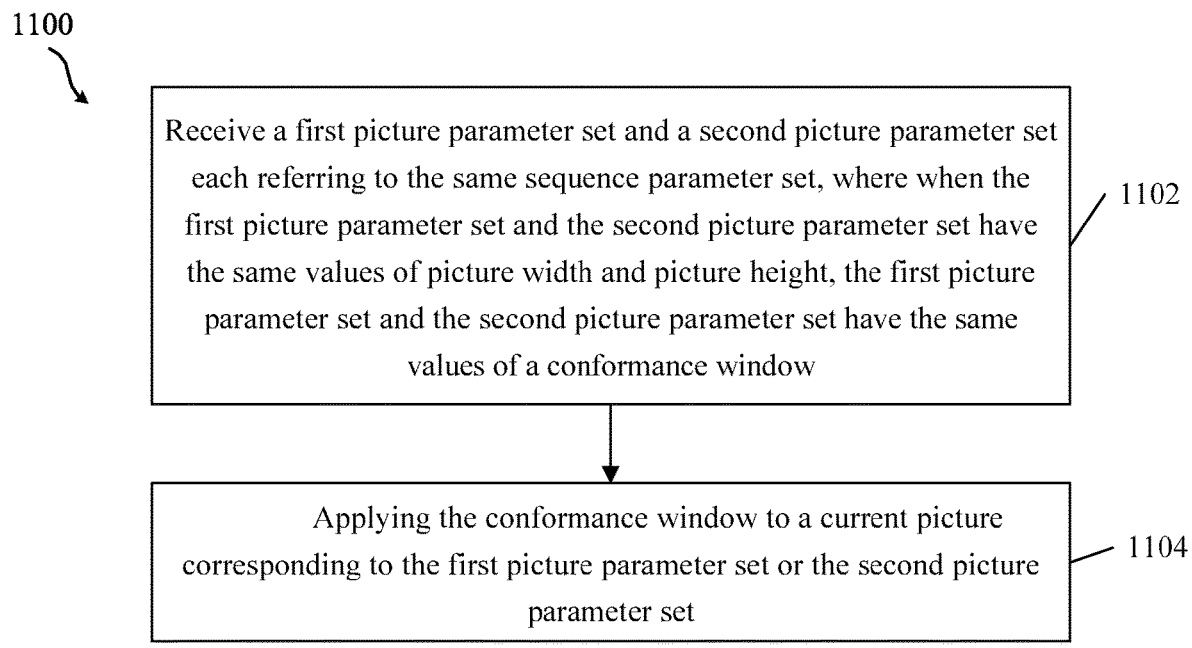
FIG. 11 is an embodiment of a method of decoding a coded video bitstream.

FIG. 11 is an embodiment of a method 1100 of decoding implemented by a video decoder (e.g., video decoder 400). The method 1100 may be performed after the decoded bitstream has been directly or indirectly received from a video encoder (e.g., video encoder 300). The method 1100 improves the decoding process by keeping the conformance window the same size for picture parameter sets having the same picture size. Thus, reference picture resampling (RPR) may remain enabled or turned on for the entire CVS. By maintaining a consistent conformance window size for picture parameter sets having the same picture size, coding efficiency may be improved. Therefore, as a practical matter, the performance of a codec is improved, which leads to a better user experience.

In block 1102, the video decoder receives a first picture parameter set (e.g., ppsA) and a second picture parameter set (e.g., ppsB) each referring to the same sequence parameter set. When the first picture parameter set and the second picture parameter set have the same values of picture width and picture height, the first picture parameter set and the second picture parameter set have the same values of a conformance window. In an embodiment, the picture width and picture height are measured in luma samples.

In an embodiment, the picture width is designated as pic_width_in_luma_samples. In an embodiment, the picture height is designated as pic_height_in_luma_samples. In an embodiment, the pic_width_in_luma_samples specifies the width of each decoded picture referring to the PPS in units of luma samples. In an embodiment, pic_height_in_luma_samples specifies the height of each decoded picture referring to the PPS in units of luma samples.

In an embodiment, the conformance window comprises a conformance window left offset, a conformance window right offset, a conformance window top offset, and a conformance window bottom offset that collectively represent the conformance window size. In an embodiment, the conformance window left offset is designated as pps_conf_win_left_offset. In an embodiment, the conformance window right offset is designated as pps_conf_win_right_offset. In an embodiment, the conformance window top offset is designated as pps_conf_win_top_offset. In an embodiment, the conformance window bottom offset is designated as pps_conf_win_bottom_offset. In an embodiment, the conformance window size or values are signaled in the PPS.

In block 1104, the video decoder applies the conformance window to a current picture corresponding to the first picture parameter set or the second picture parameter set. By doing so, the video coder crops the current picture down to the size of the conformance window.

In an embodiment, the method further comprises using inter prediction to decode the current picture based on a resampled reference picture. In an embodiment, the method further comprises resampling a reference picture corresponding to current picture using reference picture resampling (RPS). In an embodiment, the resampling of the reference picture changes a resolution of the reference picture.

In an embodiment, the method further comprises determining whether bi-direction optical flow (BDOF) is enabled for decoding the picture based on the picture width, the picture height, and the conformance window of the current picture and a reference picture for the current picture. In an embodiment, the method further comprises determining whether decoder-side motion vector refinement (DMVR) is enabled for decoding the picture based on the picture width, the picture height, and the conformance window of the current picture and a reference picture for the current picture.

In an embodiment, the method further comprises displaying on a display of an electronic device (e.g., a smart phone, tablet, laptop, personal computer, etc.) an image generated using the current block.

Figure 12:
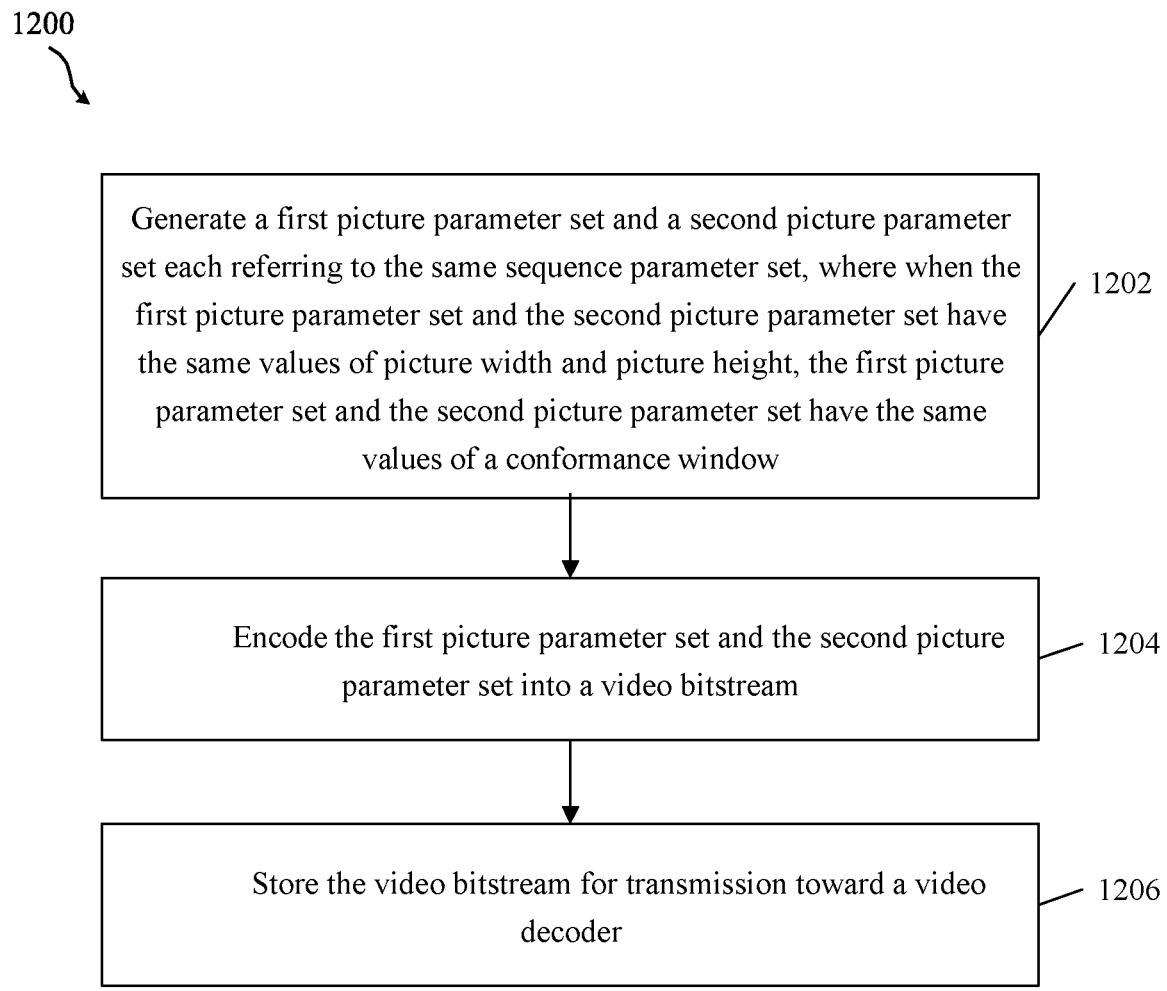
FIG. 12 is an embodiment of a method of encoding a coded video bitstream.

FIG. 12 is an embodiment of a method 1200 of encoding a video bitstream implemented by a video encoder (e.g., video encoder 300). The method 1200 may be performed when a picture (e.g., from a video) is to be encoded into a video bitstream and then transmitted toward a video decoder (e.g., video decoder 400). The method 1200 improves the encoding process by keeping the conformance window the same size for picture parameter sets having the same picture size. Thus, reference picture resampling (RPR) may remain enabled or turned on for the entire CVS. By maintaining a consistent conformance window size for picture parameter sets having the same picture size, coding efficiency may be improved. Therefore, as a practical matter, the performance of a codec is improved, which leads to a better user experience.

In block 1202, the video encoder generates a first picture parameter set and a second picture parameter set each referring to the same sequence parameter set. When the first picture parameter set and the second picture parameter set have the same values of picture width and picture height, the first picture parameter set and the second picture parameter set have the same values of a conformance window. In an embodiment, the picture width and picture height are measured in luma samples.

In an embodiment, the picture width is designated as pic_width_in_luma_samples. In an embodiment, the picture height is designated as pic_height_in_luma_samples. In an embodiment, the pic_width_in_luma_samples specifies the width of each decoded picture referring to the PPS in units of luma samples. In an embodiment, pic_height_in_luma_samples specifies the height of each decoded picture referring to the PPS in units of luma samples.

In an embodiment, the conformance window comprises a conformance window left offset, a conformance window right offset, a conformance window top offset, and a conformance window bottom offset that collectively represent the conformance window size. In an embodiment, the conformance window left offset is designated as pps_conf_win_left_offset. In an embodiment, the conformance window right offset is designated as pps_conf_win_right_offset. In an embodiment, the conformance window top offset is designated as pps_conf_win_top_offset. In an embodiment, the conformance window bottom offset is designated as pps_conf_win_bottom_offset. In an embodiment, the conformance window size or values are signaled in the PPS.

In block 1204, the video encoder encodes the first picture parameter set and the second picture parameter set into a video bitstream. In block 1206, the video encoder stores the video bitstream for transmission toward a video decoder. In an embodiment, the video encoder transmits the video bitstream containing the first picture parameter set and the second picture parameter set toward the video decoder.

In an embodiment, a method for encoding a video bitstream is provided. The bitstream comprises a plurality of parameter sets and a plurality of pictures. Each picture of the plurality of pictures comprises a plurality of slices. Each slice of the plurality of slices comprises a plurality of coding blocks. The method comprises generating and writing a parameter set parameterSetA into a bitstream containing information that includes picture size picSizeA and conformance window confWinA. The parameter may be a picture parameter set (PPS). The method further includes generating and writing another parameter set parameterSetB into a bitstream containing information that includes picture size picSizeB and conformance window confWinB. The parameter may be a picture parameter set (PPS). The method further includes constraining the values for conformance window confWinA in parameterSetA and confWinB in parameterSetB to be the same when the values of picSizeA in parameterSetA and picSizeB in parameterSetB are the same, and constraining the values for picture size picSizeA in parameterSetA and picSizeB in parameterSetB to be the same when the values of confWinA in parameterSetA and confWinB in parameterSetB are the same. The method further includes encoding the bitstream.

In an embodiment, a method for decoding a video bitstream is provided. The bitstream comprises a plurality of parameter sets and a plurality of pictures. Each picture of the plurality of pictures comprises a plurality of slices. Each slice of the plurality of slices comprises a plurality of coding blocks. The method comprises parsing a parameter set to obtain the picture size and the conformance window size associated with a current picture currPic. The obtained information is used to derive picture size and cropped size of the current picture. The method further includes parsing another parameter set to obtain the picture size and the conformance window size associated with a reference picture refPic. The obtained information is used to derive picture size and cropped size of the reference picture. The method further includes determining refPic as reference picture for decoding of a current block curBlock that is located within the current picture currPic, deciding whether bi-direction optical flow (BDOF) is used or enabled for decoding of the current coding block based on the picture size and conformance window of the current picture and the reference picture, and decoding the current block.

In an embodiment, BDOF is not used or is disabled for decoding of the current coding block when the picture size and conformance window of the current picture and the reference picture are different.

In an embodiment, a method for decoding a video bitstream is provided. The bitstream comprises a plurality of parameter sets and a plurality of pictures. Each picture of the plurality of pictures comprises a plurality of slices. Each slice of the plurality of slices comprises a plurality of coding blocks. The method comprises parsing a parameter set to obtain the picture size and the conformance window size associated with a current picture currPic. The obtained information is used to derive picture size and cropped size of the current picture. The method further includes parsing another parameter set to obtain the picture size and the conformance window size associated with a reference picture refPic. The obtained information is used to derive picture size and cropped size of the reference picture. The method further includes determining refPic as reference picture for decoding of a current block curBlock that is located within the current picture currPic, deciding whether decoder-side motion vector refinement (DMVR) is used or enabled for decoding of the current coding block based on the picture size and conformance window of the current picture and the reference picture, and decoding the current block.

In an embodiment, DMVR is not used or is disabled for decoding of the current coding block when the picture size and conformance window of the current picture and the reference picture are different.

In an embodiment, a method for encoding a video bitstream is provided. In an embodiment, the bitstream comprises a plurality of parameter sets and a plurality of pictures. Each picture of the plurality of pictures comprises a plurality of slices. Each slice of the plurality of slices comprises a plurality of coding blocks. The method comprises generating a parameter set comprising the picture size and the conformance window size associated with a current picture currPic. The information is used to derive picture size and cropped size of the current picture. The method further includes generating another parameter set comprising the picture size and the conformance window size associated with a reference picture refPic. The obtained information is used to derive picture size and cropped size of the reference picture. The method further includes constraining that reference picture refPic shall not be used as co-located reference picture for temporal motion vector prediction (TMVP) of all slices that belong to the current picture currPic when the picture size and conformance window of the current picture and the reference picture are different. That is, constraining that if reference picture refPic is the co-located reference picture for coding of blocks within the current picture currPic for TMVP, the picture size and conformance window of the current picture and the reference picture shall be the same. The method further includes decoding the bitstream.

In an embodiment, a method for decoding a video bitstream is provided. The bitstream comprises a plurality of parameter sets and a plurality of pictures. Each picture of the plurality of pictures comprises a plurality of slices. Each slice of the plurality of slices comprises a plurality of coding blocks. The method comprises parsing a parameter set to obtain the picture size and the conformance window size associated with a current picture currPic. The obtained information is used to derive picture size and cropped size of the current picture. The method further includes parsing another parameter set to obtain the picture size and the conformance window size associated with a reference picture refPic. The obtained information is used to derive picture size and cropped size of the reference picture. The method further includes determining refPic as reference picture for decoding of a current block curBlock that is located within the current picture currPic, parsing a syntax element (slice_DVMR_BDOF_enable_flag) to determine whether decoder-side motion vector refinement (DMVR) and/or bi-direction optical flow (BDOF) is used or enabled for decoding of the current coding picture and/slice. The method further includes constraining the values for syntax element (slice_DVMR_BDOF_enable_flag) to be zero when conformance window confWinA in parameterSetA and confWinB in parameterSetB are not same or when the values of picSizeA in parameterSetA and picSizeB in parameterSetB are not same.

The description below is relative to the basis text, which is the VVC working draft. That is, only the delta is described, while the texts in the basis text that are not mentioned below apply as they are. Removed text is indicated by italics and added text is in bold.

The sequence parameter set syntax and semantics are provided.

|  | Descriptor |
|---|---|
| seq_parameter_set_rbsp( ) { | |
| ... | |
| pic_width_in_luma_samples | ue(v) |
| pic_height_in_luma_samples | ue(v) |
| max_width_in_luma_samples | ue(v) |
| max_height_in_luma_samples | ue(v) |
| ... | |
| } | | max_width_in_luma_samples specifies that it is a requirement of bitstream conformance that pic_width_in_luma_samples for any picture for which this SPS is active is less than or equal to max_width_in_luma_samples.

max_height_in_luma_samples specifies that it is a requirement of bitstream conformance that pic_height_in_luma_samples for any picture for which this SPS is active is less than or equal to max_height_in_luma_samples.

The picture parameter set syntax and semantics are provided.

|  | Descriptor |
|---|---|
| pic_parameter_set_rbsp( ) { | |
| ... | |
| pps_seq_parameter_set_id | ue(v) |
| pic_width_in_luma_samples | ue(v) |
| pic_height_in_luma_samples | ue(v) |
| conformance_window_flag | u(1) |
| if( conformance_window_flag ) { | |
|   conf_win_left_offset | ue(v) |
|   conf_win_right_offset | ue(v) |
|   conf_win_top_offset | ue(v) |
|   conf_win_bottom_offset | ue(v) |
| } | |
| ... | |
| } | | pic_width_in_luma_samples specifies the width of each decoded picture referencing the PPS in units of luma samples. pic_width_in_luma_samples shall not be equal to 0 and shall be an integer multiple of MinCbSizeY.

pic_height_in_luma_samples specifies the height of each decoded picture referencing the PPS in units of luma samples. pic_height_in_luma_samples shall not be equal to 0 and shall be an integer multiple of MinCbSizeY.

It is a requirement of bitstream conformance that all of the following conditions are satisfied for every active reference picture whose width and height are reference_pic_width_in_luma_samples and reference_pic_height_in_luma_samples:

2*pic_width_in_luma_samples>=reference_pic_width_in_luma_samples

2*pic_height_in_luma_samples>=reference_pic_height_in_luma_samples pic_width_in_luma_samples<=8*reference_pic_width_in_luma_samples pic_height_in_luma_samples<=8*reference_pic_height_in_luma_samples The variables PicWidthInCtbsY, PicHeightInCtbsY, PicSizeInCtbsY, PicWidthInMinCbsY, PicHeightInMinCbsY, PicSizeInMinCbsY, PicSizeInSamplesY, PicWidthInSamplesC and PicHeightInSamplesC are derived as follows.

$$\text{PicWidthInCtbs}Y = \text{Ceil}(\text{pic\_width\_in\_luma\_samples} \div \text{CtbSize}Y) \quad (1)$$

$$\text{PicHeightInCtbs}Y = \text{Ceil}(\text{pic\_height\_in\_luma\_samples} \div \text{CtbSize}Y) \quad (2)$$

$$\text{PicSizeInCtbs}Y = \text{PicWidthInCtbs}Y * \text{PicHeightInCtbs}Y \quad (3)$$

$$\text{PicWidthInMinCbs}Y = \text{pic\_width\_in\_luma\_samples} / \text{MinCbSize}Y \quad (4)$$

$$\text{PicHeightInMinCbs}Y = \text{pic\_height\_in\_luma\_samples} / \text{MinCbSize}Y \quad (5)$$

$$\text{PicSizeInMinCbs}Y = \text{PicWidthInMinCbs}Y * \text{PicHeightInMinCbs}Y \quad (6)$$

$$\text{PicSizeInSamples}Y = \text{pic\_width\_in\_luma\_samples} * \text{pic\_height\_in\_luma\_samples} \quad (7)$$

$$\text{PicWidthInSamples}C = \text{pic\_width\_in\_luma\_samples} / \text{SubWidth}C \quad (8)$$

$$\text{PicHeightInSamples}C = \text{pic\_height\_in\_luma\_samples} / \text{SubHeight}C \quad (9)$$

conformance_window_flag equal to 1 indicates that the conformance cropping window offset parameters follow next in the PPS. conformance_window_flag equal to 0 indicates that the conformance cropping window offset parameters are not present.

conf_win_left_offset, conf_win_right_offset, conf_win_top_offset, and conf_win_bottom_offset specify the samples of the pictures referencing the PPS that are output from the decoding process, in terms of a rectangular region specified in picture coordinates for output. When conformance_window_flag is equal to 0, the values of conf_win_left_offset, conf_win_right_offset, conf_win_top_offset, and conf_win_bottom_offset are inferred to be equal to 0.

The conformance cropping window contains the luma samples with horizontal picture coordinates from SubWidthC*conf_win_left_offset to pic_width_in_luma_samples−(SubWidthC*conf_win_right_offset+1) and vertical picture coordinates from SubHeightC*conf_win_top_offset to pic_height_in_luma_samples−(SubHeightC*conf_win_bottom_offset+1), inclusive.

The value of SubWidthC*(conf_win_left_offset+conf_win_right_offset) shall be less than pic_width_in_luma_samples, and the value of SubHeightC*(conf_win_top_offset+conf_win_bottom_offset) shall be less than pic_height_in_luma_samples.

The variables PicOutputWidthL and PicOutputHeightL are derived as follows:

$$\text{PicOutputWidth}L = \text{pic\_width\_in\_luma\_samples} - \text{SubWidth}C * (\text{conf\_win\_right\_offset} + \text{conf\_win\_left\_offset}) \quad (10)$$

$$\text{PicOutputHeight}L = \text{pic\_height\_in\_pic\_size\_units} - \text{SubHeight}C * (\text{conf\_win\_bottom\_offset} + \text{conf\_win\_top\_offset}) \quad (11)$$

When ChromaArrayType is not equal to 0, the corresponding specified samples of the two chroma arrays are the samples having picture coordinates (x/SubWidthC, y/SubHeightC), where (x, y) are the picture coordinates of the specified luma samples.

NOTE—The conformance cropping window offset parameters are only applied at the output. All internal decoding processes are applied to the uncropped picture size.

Let PPS_A and PPS_B be picture parameter sets referring to the same sequence parameter set, it is a requirement of bitstream conformance that all the following conditions shall be true if the values of pic_width_in_luma_samples in PPS_A and PPS_B are the same and the values of pic_height_in_luma_samples in PPS_A and PPS_B are the same:

The values of conf_win_left_offset in PPS_A and PPS_B are the same

The values of conf_win_right_offset in PPS_A and PPS_B are the same

The values of conf_win_top_offset in PPS_A and PPS_B are the same

The values of conf_win_bottom_offset in PPS_A and PPS_B are the same

The following constraint is added to the semantics of collocated_ref_idx collocated_ref_idx specifies the reference index of the collocated picture used for temporal motion vector prediction.

When slice type is equal to P or when slice type is equal to B and collocated_from_l0_flag is equal to 1, collocated_ref_idx refers to a picture in list 0, and the value of collocated_ref_idx shall be in the range of 0 to NumRefIdxActive[0]−1, inclusive.

When slice type is equal to B and collocated_from_l0_flag is equal to 0, collocated_ref_idx refers to a picture in list 1, and the value of collocated_ref_idx shall be in the range of 0 to NumRefIdxActive[1]−1, inclusive.

When collocated_ref_idx is not present, the value of collocated_ref_idx is inferred to be equal to 0.

It is a requirement of bitstream conformance that the picture referred to by collocated_ref_idx shall be the same for all slices of a coded picture.

It is a requirement of bitstream conformance that the resolutions of the reference picture referred to by collocated_ref_idx and the current picture shall be the same.

It is a requirement of bitstream conformance that the picture sizes and the conformance windows of the reference picture referred to by collocated_ref_idx and the current picture shall be the same.

The following conditions for setting dmvrFlag to 1 are modified

When all of the following conditions are true, dmvrFlag is set equal to 1:

sps_dmvr_enabled_flag is equal to 1 general_merge_flag[xCb][yCb] is equal to 1 both_predFlagL0[0][0] and predFlagL1[0][0] are equal to 1 mmvd_merge_flag[xCb][yCb] is equal to 0

DiffPicOrderCnt(currPic, RefPicList[0][refIdxL0]) is equal to DiffPicOrderCnt(RefPicList[1][refIdxL1], currPic)

BcwIdx[xCb][yCb] is equal to 0

Both luma_weight_l0_flag[refIdxL0] and luma_weight_l1_flag[refIdxL1] are equal to 0 cbWidth is greater than or equal to 8 cbHeight is greater than or equal to 8 cbHeight*cbWidth is greater than or equal to 128

For X being each of 0 and 1, the pic_width_in_luma_samples and pic_height_in_luma_samples of the reference picture refPicLX associated with the refIdxLX are equal to the pic_width_in_luma_samples and pic_height_in_luma_samples of the current picture, respectively.

For X being each of 0 and 1, the pic_width_in_luma_samples, pic_height_in_luma_samples, conf_win_left_offset, conf_win_right_offset, conf_win_top_offset, and conf_win_bottom_offset of the reference picture refPicLX associated with the refIdxLX are equal to the pic_width_in_luma_samples, pic_height_in_luma_samples, conf_win_left_offset, conf_win_right_offset, conf_win_top_offset, and conf_win_bottom_offset of the current picture, respectively.

The following conditions for setting dmvrFlag to 1 are modified

If all of the following conditions are true, bdofFlag is set equal to TRUE.

sps_bdof_enabled_flag is equal to 1.

predFlagL0[xSbIdx][ySbIdx] and predFlagL1 [xSbIdx][ySbIdx] are both equal to 1.

DiffPicOrderCnt(currPic, RefPicList[0][refIdxL0])*DiffPicOrderCnt(currPic, RefPicList[1][refIdxL1]) is less than 0.

MotionModelIdc[xCb][yCb] is equal to 0.

merge_subblock_flag[xCb][yCb] is equal to 0.

sym_mvd_flag[xCb][yCb] is equal to 0.

BcwIdx[xCb][yCb] is equal to 0.

luma_weight_l0_flag[refIdxL0] and luma_weight_l1_flag[refIdxL1] are both equal to 0.

cbHeight is greater than or equal to 8

For X being each of 0 and 1, the pic_width_in_luma_samples and pic_height_in_luma_samples of the reference picture refPicLX associated with the refIdxLX are equal to the pic_width_in_luma_samples and pic_height_in_luma_samples of the current picture, respectively.

For X being each of 0 and 1, the pic_width_in_luma_samples, pic_height_in_luma_samples, conf_win_left_offset, conf_win_right_offset, conf_win_top_offset, and conf_win_bottom_offset of the reference picture refPicLX associated with the refIdxLX are equal to the pic_width_in_luma_samples, pic_height_in_luma_samples, conf_win_left_offset, conf_win_right_offset, conf_win_top_offset, and conf_win_bottom_offset of the current picture, respectively.

cIdx is equal to 0.

Figure 13:
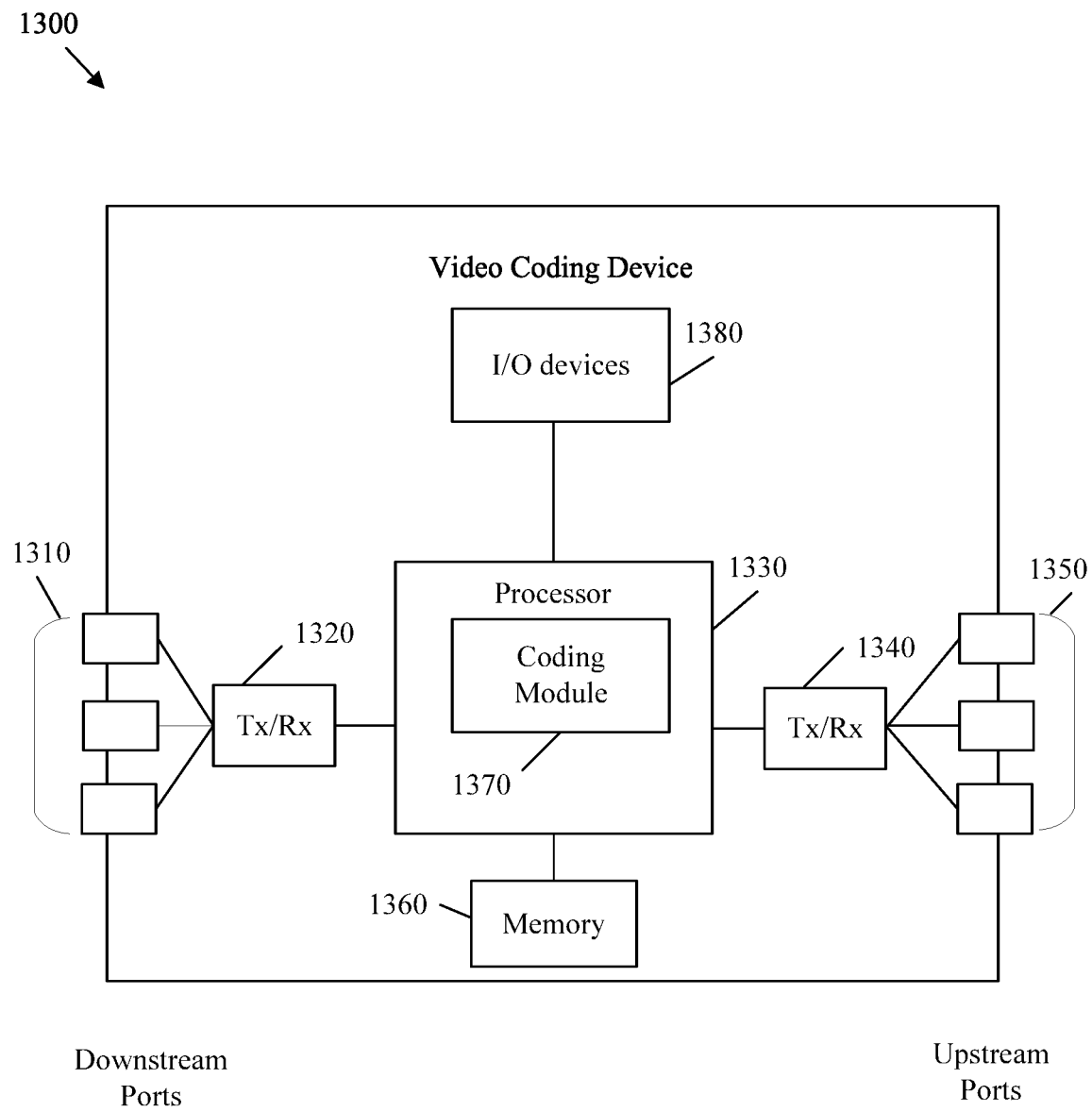
FIG. 13 is a schematic diagram of a video coding device.

FIG. 13 is a schematic diagram of a video coding device 1300 (e.g., a video encoder 20 or a video decoder 30) according to an embodiment of the disclosure. The video coding device 1300 is suitable for implementing the disclosed embodiments as described herein. The video coding device 1300 comprises ingress ports 1310 and receiver units (Rx) 1320 for receiving data; a processor, logic unit, or central processing unit (CPU) 1330 to process the data; transmitter units (Tx) 1340 and egress ports 1350 for transmitting the data; and a memory 1360 for storing the data.

The video coding device 1300 may also comprise optical-to-electrical (OE) components and electrical-to-optical (EO) components coupled to the ingress ports 1310, the receiver units 1320, the transmitter units 1340, and the egress ports 1350 for egress or ingress of optical or electrical signals.

The processor 1330 is implemented by hardware and software. The processor 1330 may be implemented as one or more CPU chips, cores (e.g., as a multi-core processor), field-programmable gate arrays (FPGAs), application specific integrated circuits (ASICs), and digital signal processors (DSPs). The processor 1330 is in communication with the ingress ports 1310, receiver units 1320, transmitter units 1340, egress ports 1350, and memory 1360. The processor 1330 comprises a coding module 1370. The coding module 1370 implements the disclosed embodiments described above. For instance, the coding module 1370 implements, processes, prepares, or provides the various codec functions. The inclusion of the coding module 1370 therefore provides a substantial improvement to the functionality of the video coding device 1300 and effects a transformation of the video coding device 1300 to a different state. Alternatively, the coding module 1370 is implemented as instructions stored in the memory 1360 and executed by the processor 1330.

The video coding device 1300 may also include input and/or output (I/O) devices 1380 for communicating data to and from a user. The I/O devices 1380 may include output devices such as a display for displaying video data, speakers for outputting audio data, etc. The I/O devices 1380 may also include input devices, such as a keyboard, mouse, trackball, etc., and/or corresponding interfaces for interacting with such output devices.

The memory 1360 comprises one or more disks, tape drives, and solid-state drives and may be used as an overflow data storage device, to store programs when such programs are selected for execution, and to store instructions and data that are read during program execution. The memory 1360 may be volatile and/or non-volatile and may be read-only memory (ROM), random access memory (RAM), ternary content-addressable memory (TCAM), and/or static random-access memory (SRAM).

Figure 14:
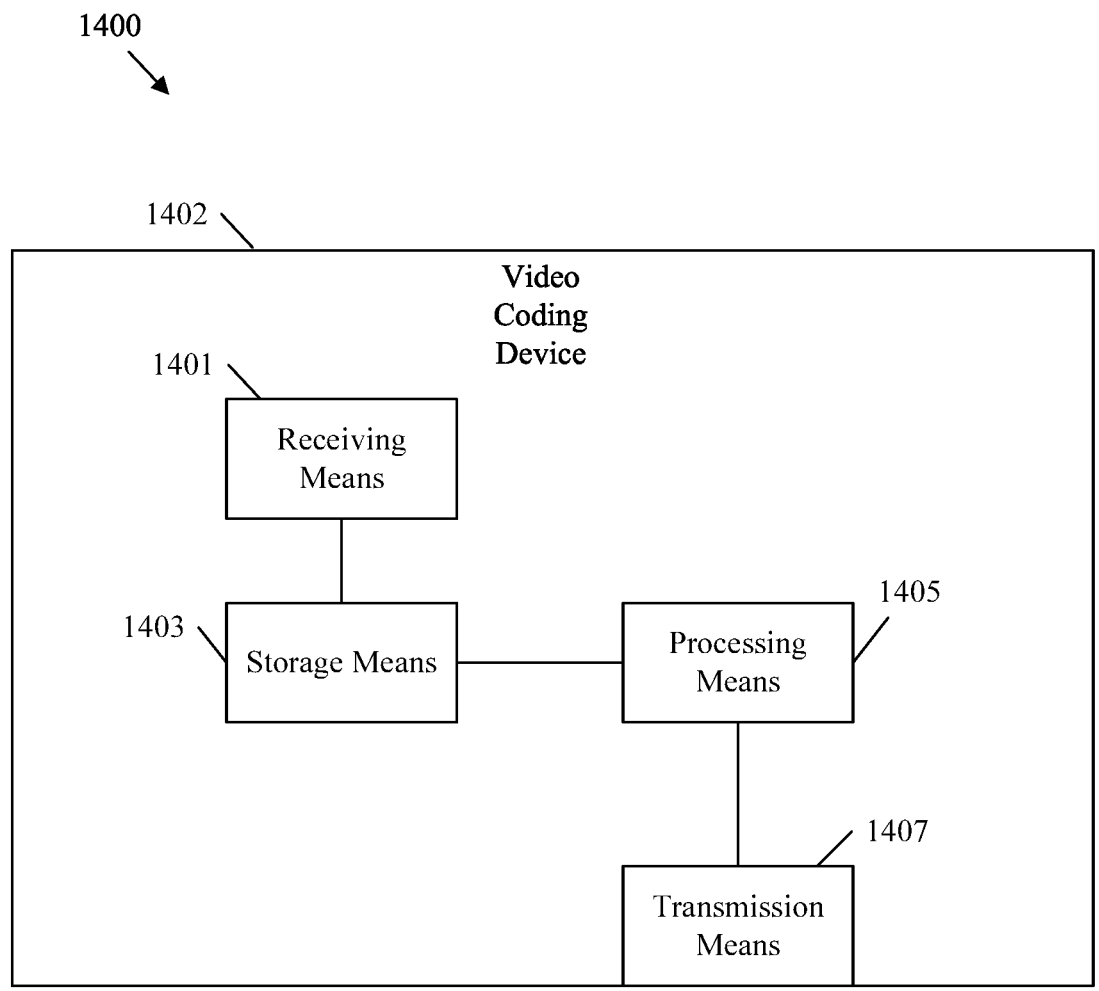
FIG. 14 is a schematic diagram of an embodiment of a means for coding.

FIG. 14 is a schematic diagram of an embodiment of a means for coding 1400. In an embodiment, the means for coding 1400 is implemented in a video coding device 1402 (e.g., a video encoder 20 or a video decoder 30). The video coding device 1402 includes receiving means 1401. The receiving means 1401 is configured to receive a picture to encode or to receive a bitstream to decode. The video coding device 1402 includes transmission means 1407 coupled to the receiving means 1401. The transmission means 1407 is configured to transmit the bitstream to a decoder or to transmit a decoded image to a display means (e.g., one of the I/O devices 1380).

The video coding device 1402 includes a storage means 1403. The storage means 1403 is coupled to at least one of the receiving means 1401 or the transmission means 1407. The storage means 1403 is configured to store instructions. The video coding device 1402 also includes processing means 1405. The processing means 1405 is coupled to the storage means 1403. The processing means 1405 is configured to execute the instructions stored in the storage means 1403 to perform the methods disclosed herein.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method of decoding implemented by a video decoder, comprising:
    receiving, by the video decoder, a first picture parameter set and a second picture parameter set each referring to same sequence parameter set, the first picture parameter set and the second picture parameter set having same values of a conformance window when the first picture parameter set and the second picture parameter set have same values of picture width and picture height; and
    applying, by the video decoder, the conformance window to a current picture corresponding to the first picture parameter set or the second picture parameter set.

2. The method of claim 1, wherein the conformance window comprises a conformance window left offset, a conformance window right offset, a conformance window top offset, and a conformance window bottom offset.

3. The method of claim 1, further comprising decoding the current picture corresponding to the first picture parameter set or the second picture parameter set using inter prediction after the conformance window has been applied, wherein the inter prediction is based on a resampled reference picture.

4. The method of claim 1, further comprising resampling a reference picture associated with the current picture corresponding to the first picture parameter set or the second picture parameter set using reference picture resampling (RPS).

5. The method of claim 4, wherein the resampling of the reference picture changes a resolution of the reference picture used to inter predict the current picture corresponding to the first picture parameter set or the second picture parameter set.

6. The method of claim 1, wherein the picture width and the picture height are measured in luma samples.

7. The method of claim 1, further comprising determining whether bi-direction optical flow (BDOF) is enabled for decoding the current picture based on the picture width, the picture height, and the conformance window of the current picture and a reference picture for the current picture.

8. The method of claim 1, further comprising determining whether decoder-side motion vector refinement (DMVR) is enabled for decoding the current picture based on the picture width, the picture height, and the conformance window of the current picture and a reference picture for the current picture.

9. The method of claim 1, further comprising displaying on a display of an electronic device an image generated using the current picture.

10. A method of encoding implemented by a video encoder, the method comprising:
    generating, by the video encoder, a first picture parameter set and a second picture parameter set each referring to same sequence parameter set, the first picture parameter set and the second picture parameter set having same values of a conformance window when the first picture parameter set and the second picture parameter set have same values of picture width and picture height;
    encoding, by the video encoder, the first picture parameter set and the second picture parameter set into a video bitstream; and
    storing, by the video encoder, the video bitstream for transmission toward a video decoder.

11. The method of claim 10, wherein the conformance window comprises a conformance window left offset, a conformance window right offset, a conformance window top offset, and a conformance window bottom offset.

12. The method of claim 10, wherein the picture width and the picture height are measured in luma samples.

13. The method of claim 10, further comprising transmitting the video bitstream containing the first picture parameter set and the second picture parameter set toward the video decoder.

14. A decoding device, comprising:
    a receiver configured to receive a coded video bitstream;
    a memory coupled to the receiver, the memory storing instructions; and
    a processor coupled to the memory, the processor configured to execute the instructions to cause the decoding device to:
        receive a first picture parameter set and a second picture parameter set each referring to same sequence parameter set, the first picture parameter set and the second picture parameter set having same values of a conformance window when the first picture parameter set and the second picture parameter set have same values of picture width and picture height; and
        apply the conformance window to a current picture corresponding to the first picture parameter set or the second picture parameter set.

15. The decoding device of claim 14, wherein the conformance window comprises a conformance window left offset, a conformance window right offset, a conformance window top offset, and a conformance window bottom offset.

16. The decoding device of claim 15, further comprising a display configured to display an image generated based on the current picture.

17. The decoding device of claim 14, further comprising decoding the current picture corresponding to the first picture parameter set or the second picture parameter set using inter prediction after the conformance window has been applied, wherein the inter prediction is based on a resampled reference picture.

18. An encoding device, comprising:

a memory containing instructions;

a processor coupled to the memory, the processor configured to implement the instructions to cause the encoding device to:

generate a first picture parameter set and a second picture parameter set each referring to same sequence parameter set, the first picture parameter set and the second picture parameter set having same values of a conformance window when the first picture parameter set and the second picture parameter set have same values of picture width and picture height; and encode the first picture parameter set and the second picture parameter set into a video bitstream; and a transmitter coupled to the processor, the transmitter configured to transmit the video bitstream containing the first picture parameter set and the second picture parameter set toward a video decoder.

19. The encoding device of claim 18, wherein the conformance window comprises a conformance window left offset, a conformance window right offset, a conformance window top offset, and a conformance window bottom offset.

20. The encoding device of claim 18, wherein the picture width and the picture height are measured in luma samples.

* * * * *